US006854938B2

(12) United States Patent
Kopras et al.

(10) Patent No.: US 6,854,938 B2
(45) Date of Patent: Feb. 15, 2005

(54) AUTOMATIC LOCKING DEPTH GUIDE FOR CUTTING TOOLS AND THE LIKE

(75) Inventors: Robert K. Kopras, Black Earth, WI (US); Scott Adler, Madison, WI (US); Jason R. Kopras, Mount Horeb, WI (US); James Stanley, Willowbrook, IL (US)

(73) Assignee: Credo Technology Corporation, Wilmington, DE (US)

( * ) Notice: Subject to any disclaimer, the term of this patent is extended or adjusted under 35 U.S.C. 154(b) by 40 days.

(21) Appl. No.: 10/149,890

(22) PCT Filed: Jul. 11, 2001

(86) PCT No.: PCT/US01/21782

§ 371 (c)(1),
(2), (4) Date: Nov. 13, 2002

(87) PCT Pub. No.: WO02/04182

PCT Pub. Date: Jan. 17, 2002

(65) Prior Publication Data

US 2003/0206779 A1 Nov. 6, 2003

Related U.S. Application Data

(63) Continuation-in-part of application No. 09/613,889, filed on Jul. 11, 2000, now Pat. No. 6,443,676.

(51) Int. Cl.[7] .................................................. B23C 1/20

(52) U.S. Cl. ....................... 409/182; 409/180; 409/137; 409/210; 409/218; 409/206; 144/136.95

(58) Field of Search ................................ 409/182, 181, 409/180, 179, 175, 137, 210, 214, 218, 204, 206; 451/358, 344; 30/505, 286, 289; 144/154.5, 136.95; 408/14, 110, 111, 112, 113, 241 S

(56) References Cited

U.S. PATENT DOCUMENTS

| | | | | |
|---|---|---|---|---|
| 1,565,790 A | | 12/1925 | Carter | |
| 1,581,719 A | | 4/1926 | Carter | |
| 1,584,078 A | | 5/1926 | Carter | |
| 1,904,109 A | | 4/1933 | Wendorf | |
| 3,550,481 A | | 12/1970 | Jensen | |
| 3,633,682 A | | 1/1972 | Moores, Jr. | |
| 3,635,268 A | * | 1/1972 | Lange | 144/154.5 |
| 3,746,460 A | | 7/1973 | Lipe | |
| 3,791,260 A | | 2/1974 | Ambler et al. | |
| 4,273,483 A | | 6/1981 | Mendicino | |
| 4,562,872 A | | 1/1986 | Fushiya et al. | |
| 4,572,715 A | | 2/1986 | Wolff | |
| 4,770,573 A | | 9/1988 | Monobe | |
| 4,938,642 A | | 7/1990 | Imahashi et al. | |

(List continued on next page.)

FOREIGN PATENT DOCUMENTS

| | | |
|---|---|---|
| DE | 2705410 | 8/1978 |
| DE | 4326652 | 1/1994 |

*Primary Examiner*—Erica Cadugan
(74) *Attorney, Agent, or Firm*—Foley & Lardner LLP

(57) ABSTRACT

A guide (12) for setting the depth of cut of a rotary cutting tool, or other hand-held power tool, which automatically locks into a desired position to set the depth of a cut without requiring manual operation of a locking knob or similar structure. The depth guide is released from the locked position by actuation of a release switch (94). The depth guide includes a depth guide base (50), a depth guide shaft (52) attached to the depth guide base, and an automatic locking and release mechanism (54) coupled to the depth guide shaft. The automatic locking and release mechanism and depth guide shaft may be mounted in a handle (24) of the hand-held power tool, such as a detachable handle, for mounting the depth guide to the tool.

78 Claims, 11 Drawing Sheets

U.S. PATENT DOCUMENTS

| | | | | | |
|---|---|---|---|---|---|
| 5,143,490 | A | | 9/1992 | Kopras | |
| 5,143,494 | A | | 9/1992 | McCurry | |
| 5,310,296 | A | | 5/1994 | McCurry | |
| 5,323,823 | A | | 6/1994 | Kopras | |
| 5,486,076 | A | * | 1/1996 | Hauschopp | 409/179 |
| 5,584,620 | A | * | 12/1996 | Blickhan et al. | 409/137 |
| 5,671,789 | A | | 9/1997 | Stolzer et al. | |
| 5,813,805 | A | | 9/1998 | Kopras | |
| 5,902,080 | A | | 5/1999 | Kopras | |
| 6,048,260 | A | | 4/2000 | Kopras | |
| D439,122 | S | | 3/2001 | Adler et al. | |
| D439,484 | S | | 3/2001 | Adler et al. | |
| 6,443,676 | B1 | * | 9/2002 | Kopras | 409/182 |
| D465,393 | S | * | 11/2002 | Kopras et al. | D8/61 |
| D465,712 | S | * | 11/2002 | Kopras et al. | D8/61 |
| D473,770 | S | * | 4/2003 | Kopras et al. | D8/61 |

* cited by examiner

AUTOMATIC LOCKING DEPTH GUIDE FOR CUTTING TOOLS AND THE LIKE

RELATED APPLICATIONS

This application is a National Stage of International Application No. PCT/US01/21782, filed Jul. 11, 2001, which was published in English under PCT Article 21(2) on Jan. 17, 2002 as International Publication Number WO 02/04182 and which is a continuation-in-part of U.S. patent application Ser. No. 09/613,889, filed Jul. 11, 2000, now U.S. Pat. No. 6,443,676.

FIELD OF THE INVENTION

This invention pertains generally to hand-held power tools, such as hand-held cutting tools. Specifically, the invention pertains to adjustable depth guides for setting the depth of cut to be made by such power tools.

BACKGROUND OF THE INVENTION

A Spiral Saw™ cutting tool is a hand-held power tool having an electric motor that rotates a cutting tool bit at high speeds. Such a cutting tool bit includes a sharp cutting edge that is wrapped in a helix around the axis of the bit. The cutting tool bit is designed for cutting perpendicular to the axis of the bit. The electric motor that drives the bit is enclosed in a motor housing which is generally cylindrical in shape, with the cutting tool bit extending from one end of the motor housing along the axis of the housing. A Spiral Saw™ cutting tool is used to remove material from a work piece by moving the rotating cutting tool bit through the work piece in a direction perpendicular to the axis of rotation of the bit. A Spiral Saw™ cutting tool is conventionally operated by grasping the motor housing with one or both hands, turning on the electric motor to begin high speed rotation of the cutting tool bit, plunging the spinning cutting tool bit into a work piece, such as a piece of wood, and then moving the cutting tool bit through the work piece in a direction perpendicular to the axis of the cutting tool bit by moving the motor housing in a direction parallel to the plane of the work piece while keeping the axis of the motor housing generally perpendicular to the work piece surface.

Precise control of a cut being made by a Spiral Saw™ cutting tool, or any other hand-held power tool, is dependent upon the tool operator maintaining a firm grasp on the tool. Various methods have been employed to ensure that an operator maintains a firm grip on a hand-held power tool. With extended and continuous operation, the motor housing of a cutting tool can become warm, and cutting tool vibrations may cause an operator's hands and arms to become fatigued. Extended and continuous use of a Spiral Saw™ cutting tool by grasping the motor housing can, therefore, become uncomfortable, reducing the ability of the operator to control precisely the cut being made. U.S. Pat. No. 5,813,805, issued to Robert K. Kopras, describes a detachable handle for cutting tools and other similar hand-held power tools. The detachable handle provides for extensive continuous use of the power tool while maintaining operator comfort and cutting tool control. The handle may be attached securely to the Spiral Saw™ cutting tool when the tool is to be used for extended periods of time, or generally to enhance the operator's comfort and control in using the cutting tool. The handle may be removed from the tool, for example, when the Spiral Saw™ cutting tool is to be used in tight quarters wherein the handle might become an obstacle to precise control of the cutting tool. The handle is removably secured to the Spiral Saw™ cutting tool by threaded knobs that are inserted through mounting holes in the ends of the handle and tightly threaded into threaded holes formed in handle lugs extending from the motor housing. The threaded knobs are preferably designed so that the detachable handle may be secured tightly to the handle lugs by hand, without the need for a wrench or other tool. The detachable handle also features compartments formed therein for holding various cutting tool accessories, such as extra cutting tool bits and a wrench for securing the bits to the cutting tool.

To set the depth of a cut to be made by a Spiral Saw™ cutting tool, or other hand-held power tool, the tool is typically provided with a depth guide. The depth guide typically includes a depth guide base, which is attached to the power tool housing via one or more depth guide shafts. The depth guide shafts are attached to the power tool housing so as to be slidably movable with respect thereto, thereby allowing the depth guide base to be moved into positions of various distances from the tool, to set various cut depths. A locking knob is typically provided as part of the depth guide which, when tightened, typically by hand, prevents movement of the depth guide shafts and, therefore, movement of the base portion of the depth guide with respect to the tool. To set a depth of cut using such a depth guide, the locking knob is first loosened, to allow movement of the depth guide shafts. The depth guide base is then moved into the desired position to establish the desired depth of cut by moving the depth guide shafts relative to the power tool housing. Markings may be provided, e.g., on the depth guide shafts or on a mechanism attached thereto, to assist in establishing the correct desired cut depth. When the depth guide base is positioned in the desired position, the locking knob is manually tightened, to prevent further movement of the depth guide shafts, and, therefore, of the depth guide base. When locked into position, the bottom of the depth guide base provides a surface which is placed against a work piece to be cut, with a cutting bit extending below the surface by a desired amount corresponding to the depth of cut.

Cutting debris, such as sawdust, can accumulate in the base of a conventional depth guide, around the point of a cut, as the tool to which the depth guide is attached is used to make a cut. The accumulated debris can obscure the point of the cut, i.e., the point where a cutting bit enters a work piece, thereby interfering with accurate use of the tool.

What is desired is a depth guide for setting the depth of cut of a Spiral Saw™ cutting tool, or similar hand-held power tool, which is more easily and rapidly operable than conventional depth guides as described above. What is also desired is a device for removing effectively cutting debris from the base of a depth guide for a hand held power tool.

SUMMARY OF THE INVENTION

An exemplary embodiment relates to a depth guide for a hand-held power tool. The depth guide includes a depth guide base, a depth guide shaft attached to the depth guide base, and an automatic locking and release mechanism coupled to the depth guide shaft. The automatic locking and release mechanism includes a mechanism for automatically locking the depth guide shaft into a locked position when the depth guide shaft is moved into a desired position. The automatic locking and release mechanism also includes a release switch coupled to the automatic locking mechanism to release the depth guide shaft from the locked position when the release switch is actuated.

Another exemplary embodiment of a depth guide for a hand-held power tool comprises a hand-held power tool handle, a depth guide base, and a depth guide shaft attached to the depth guide base. The depth guide shaft is mounted in the hand-held power tool handle such that the depth guide shaft extends from the hand-held power tool handle.

Still another exemplary embodiment of an automatic-locking depth guide for a hand-held power tool. Comprises a handle for a hand-held power tool and a release switch coupled to the handle. The depth guide also includes a depth guide base, a depth guide shaft attached to the depth guide base and mounted in the hand-held power tool such that the depth guide shaft extends from the hand-held power tool handle. The depth guide also includes a depth guide locking mechanism contained within the handle. The locking mechanism includes a locking plate that includes an aperture through which the depth guide shaft extends and also an extension for engaging a release element coupled to the release switch.

Further objects, features and advantages of the invention will be apparent from the following detailed description taken in conjunction with the accompanying drawings.

BRIEF DESCRIPTION OF THE DRAWINGS

The invention will become more fully understood from the following detailed description, taken in conjunction with the accompanying figures, wherein like reference numerals refer to like elements, in which.

DETAILED DESCRIPTION OF THE PREFERRED EMBODIMENTS

Figure 1:
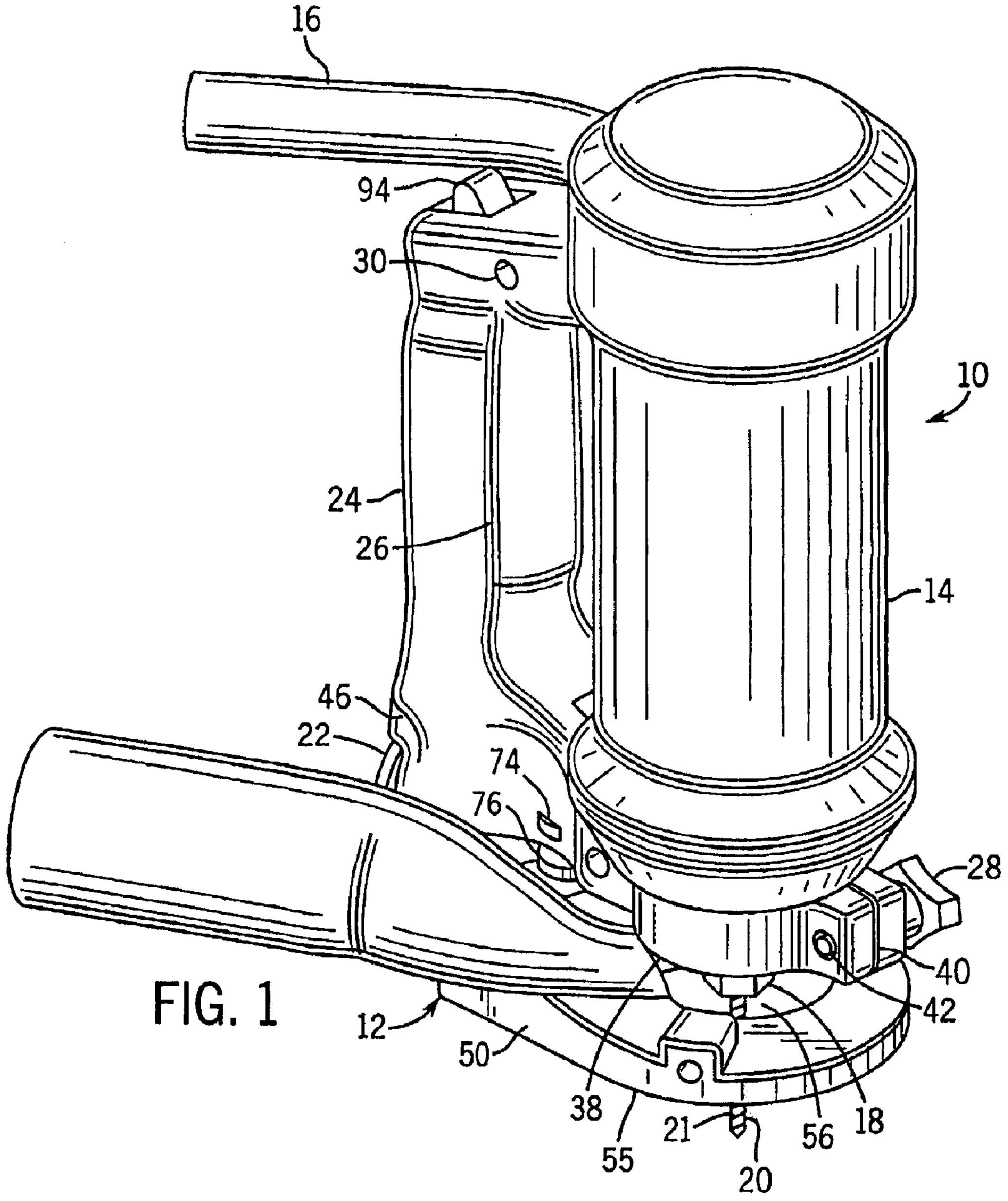
FIG. 1 is a perspective view of a Spiral Saw™ cutting tool including an exemplary automatic locking depth guide in accordance with the present invention attached thereto.
Figure 2:
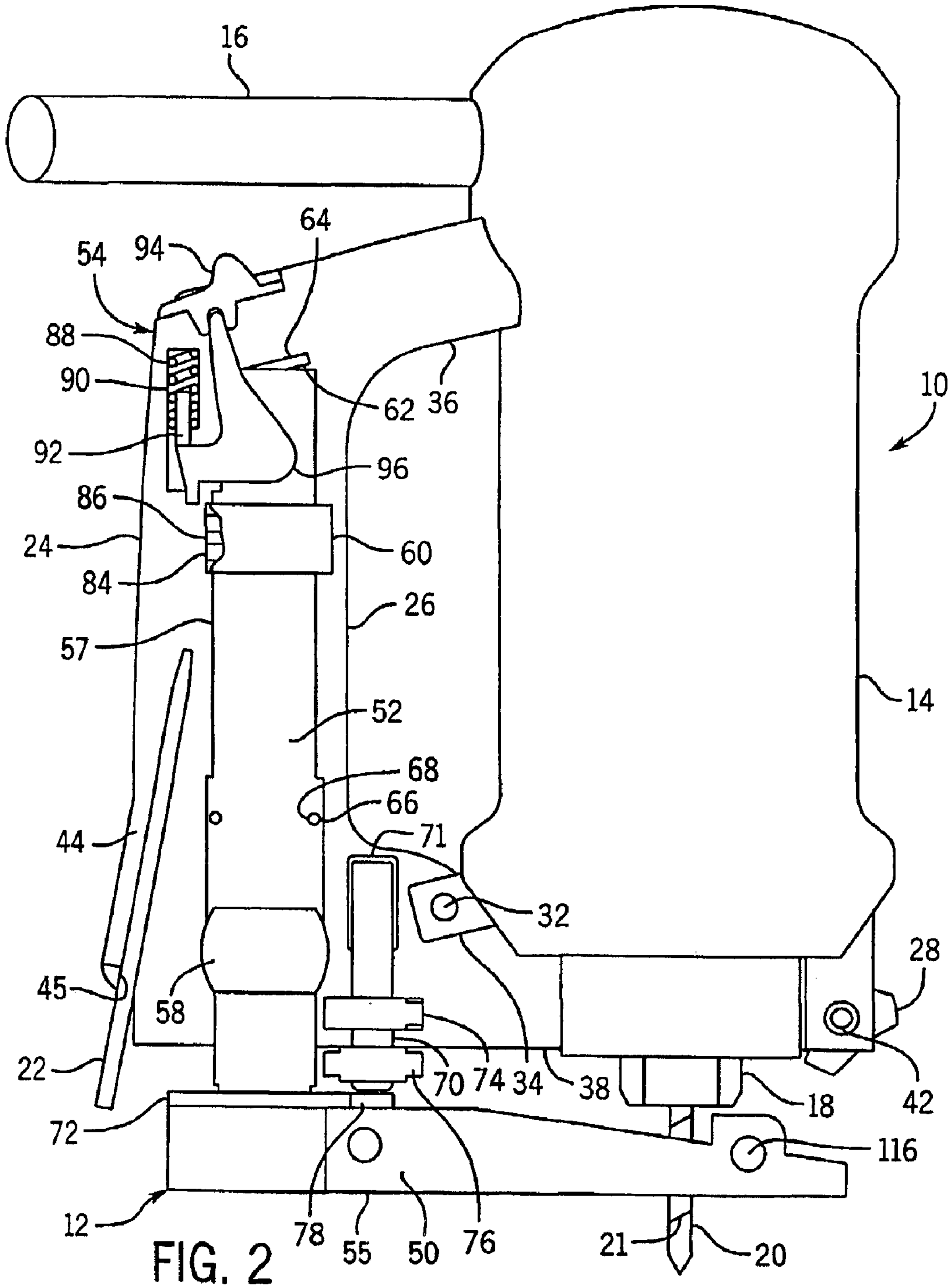
FIG. 2 a side view of a Spiral Saw™ cutting tool including an exemplary automatic locking depth guide in accordance with the present invention attached thereto, with a cutting tool handle shown in cross-section to show an automatic locking and release mechanism of the depth guide mounted therein.
Figure 3:
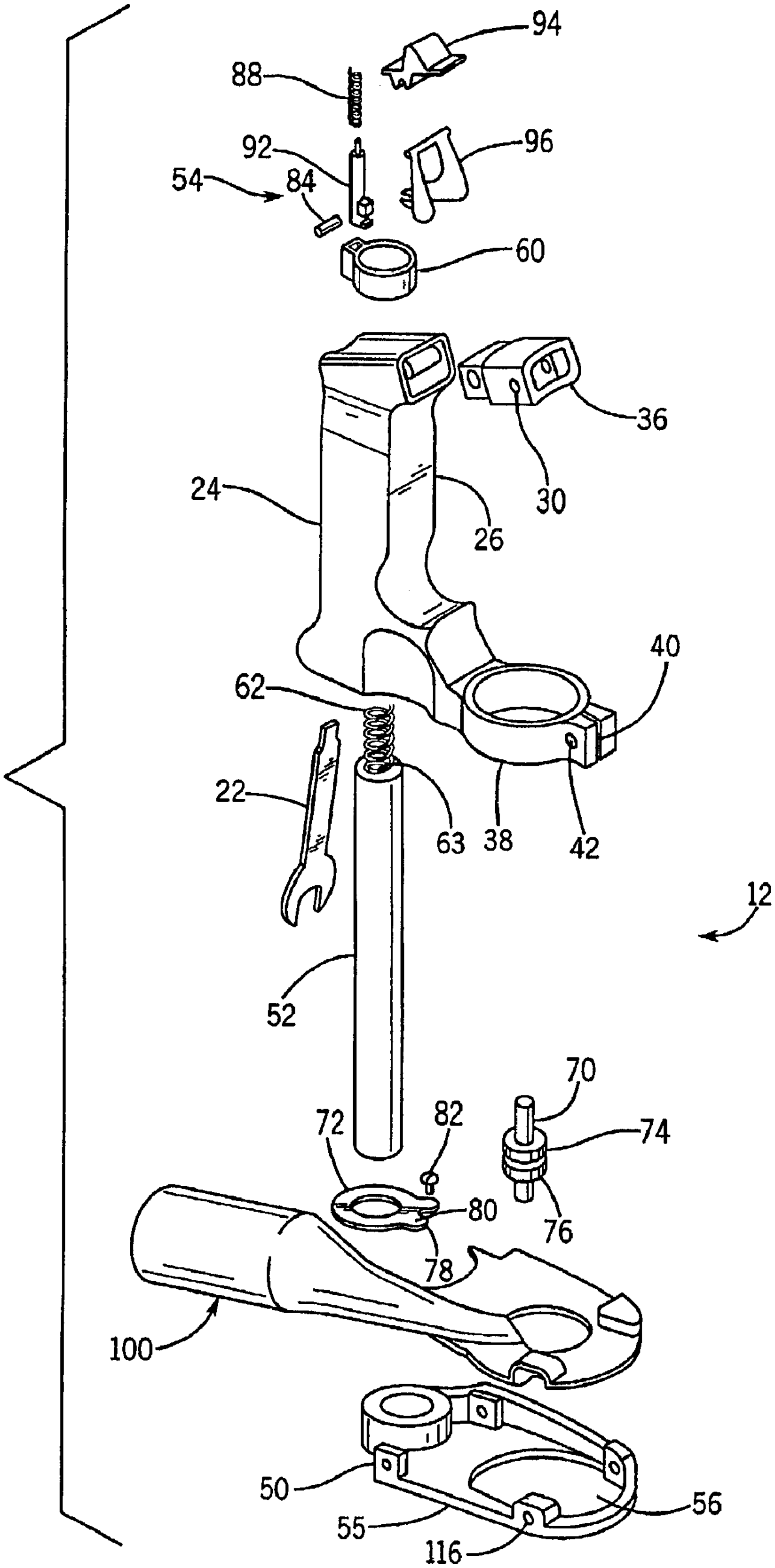
FIG. 3 is an exploded perspective view of the components of an exemplary automatic locking depth guide in accordance with the present invention.
Figure 4:
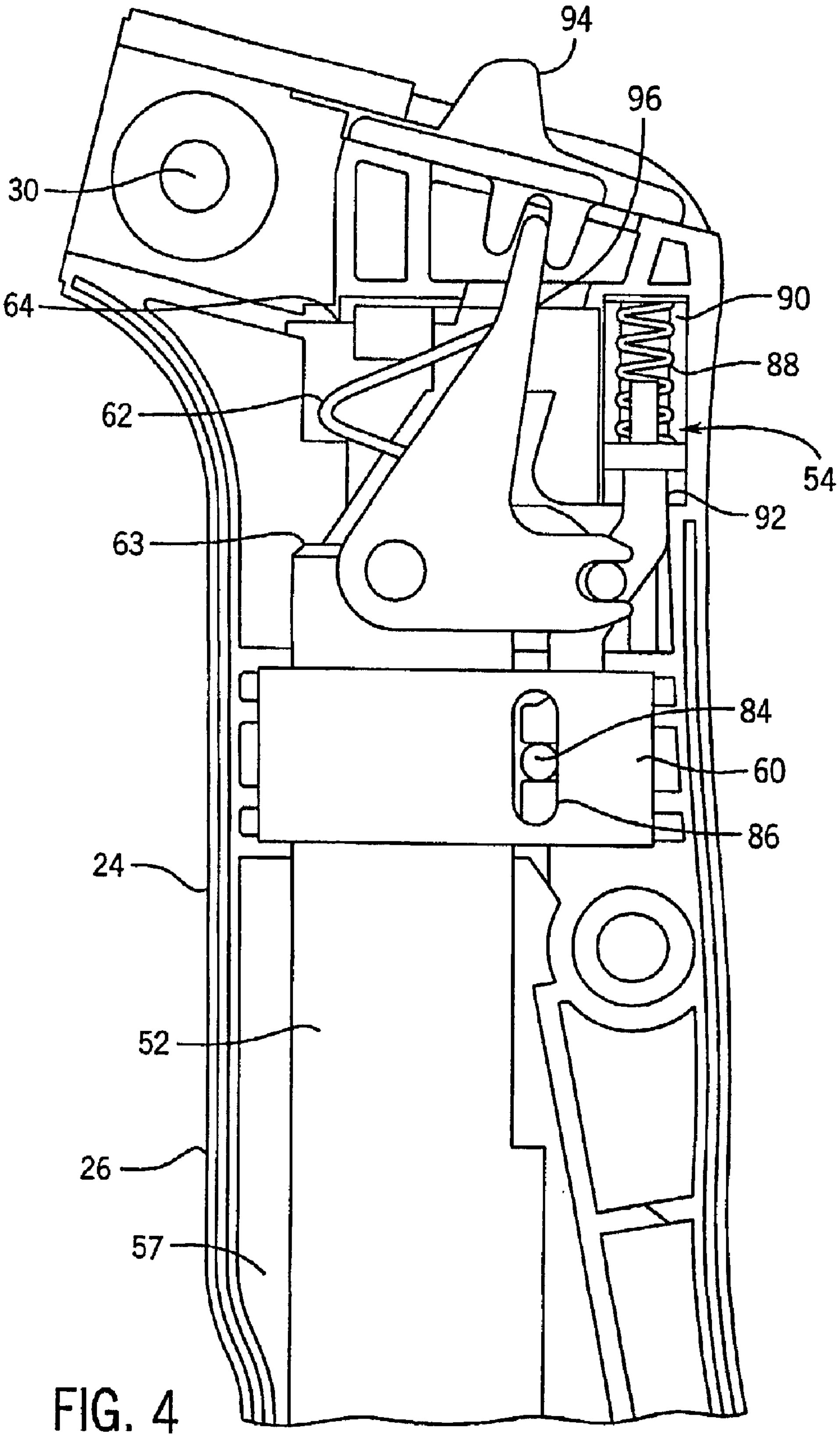
FIG. 4 is a side view illustration in further detail of an exemplary automatic locking and release mechanism for an automatic locking depth guide in accordance with the present invention.
Figure 5:
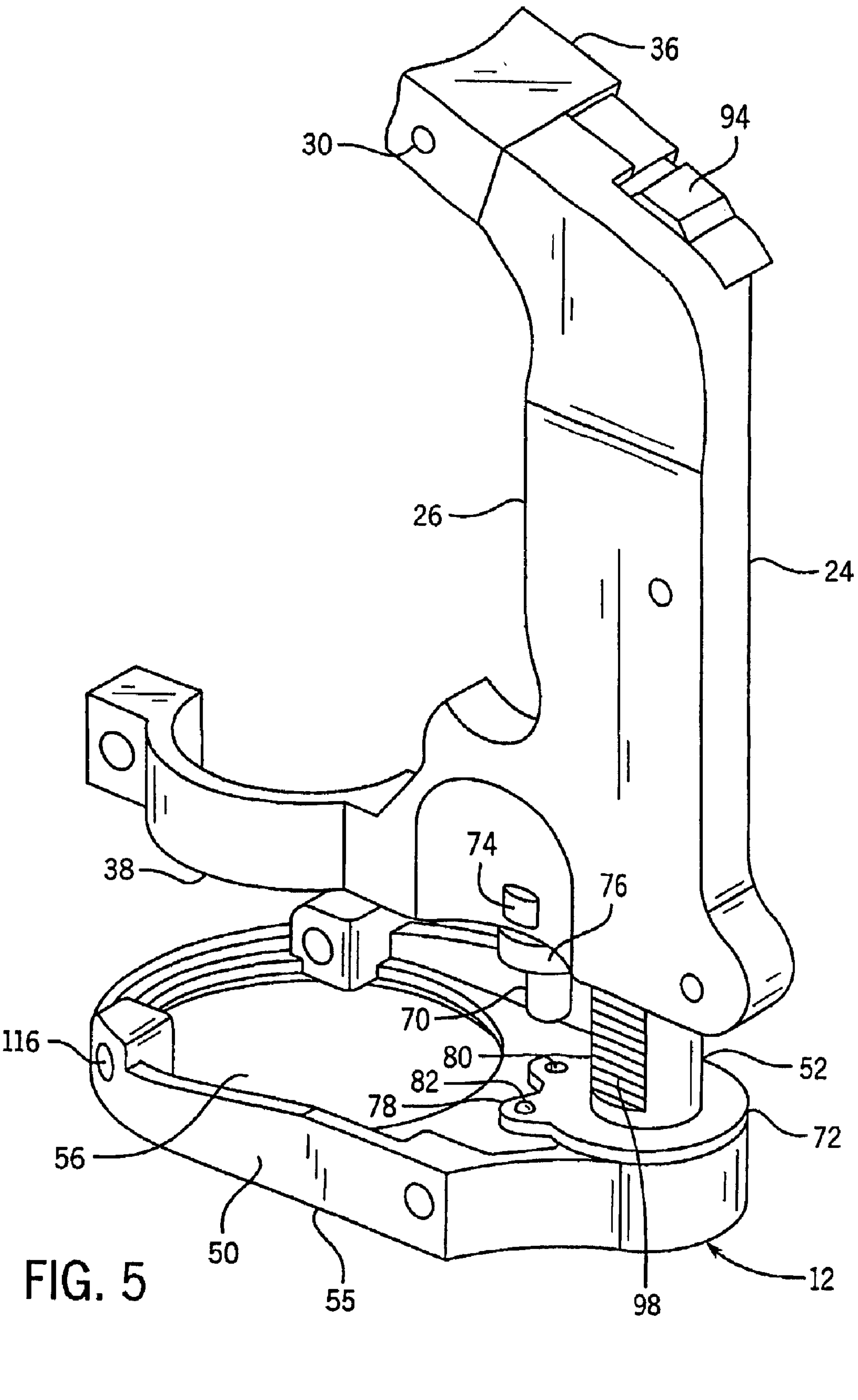
FIG. 5 is a perspective view of an exemplary automatic locking depth guide in accordance with the present invention mounted in a detachable handle for a cutting tool.

A Spiral Saw™ cutting tool 10, with an automatic locking depth guide 12 in accordance with the present invention attached thereto, is shown generally in FIGS. 1 and 2. Although described in detail herein with respect to a particular type of Spiral Saw™ cutting tool 10, it should be noted that the present invention is not limited in application to any particular cutting tool design. The automatic locking depth guide of the present invention may be used with other types of cutting tools, or similar hand-held power tools. For example, the automatic locking depth guide of the present invention may also be applicable to hand-held routers or similar power tools.

The cutting tool 10 includes a motor housing 14, to which automatic locking depth guide 12 is attached. Motor housing 14 is made of an electrically insulating material, such as hard plastic. Motor housing 14 is generally cylindrical in shape, and may include raised gripping surfaces (not shown) that allow a firm grip on cutting tool 10 to be maintained when cutting tool 10 is grasped around motor housing 14.

An electric motor (not visible in FIGS. 1 and 2) is enclosed within motor housing 14. An exemplary electric motor that may be employed is a conventional 4 amp 115–120V AC electric motor with a no-load rotation speed of 30,000 rpm. Other electric motors, including variable speed motors, may also be employed. The motor receives electrical power through an electrical cord 16 (only a portion of which is shown in FIGS. 1 and 2). Electrical cord 16 may preferably include a rubber cover that stays flexible in cold operating environments. A thick rubber connecting sleeve is preferably provided where electrical cord 16 is joined to motor housing 14. This connecting sleeve provides strain relief at the end of electrical cord 16 to prevent crimping, cracking and excessive wear of cord 16 where it is joined to cutting tool 10. The electric motor is turned on and off by an on/off switch (not shown) on motor housing 14. A fan, located within motor housing 14, is preferably attached to the motor shaft. When the motor is turned on, by means of the on/off switch, the fan is rotated at a high speed to draw air through the motor housing and across the electric motor to thereby cool the motor. For this purpose, air intake vents and exhaust vents are preferably provided in motor housing 14. Cool air is thus drawn by the motor fan into the motor housing through the air intake vents to cool the electric motor, with warm air exhausted from the motor housing through the exhaust air vents.

An end of the motor shaft extends from one end of motor housing 14 along the axis thereof. Attached to the end of the motor shaft is a mechanical structure 18 for securing a cutting tool bit 20 to the motor shaft. Cutting tool bit 20 has a cutting edge 21 arranged in a helix around the axis of bit 20. Cutting edge 21 is designed such that bit 20, when rotated at high speed, will cut through a work piece in a direction perpendicular to the axis of bit 20. In this cutting process, significant force is applied to bit 20 perpendicular to the axis thereof. Thus, although a conventional drill type chuck may be used for structure 18 that mechanically connects bit 20 to the motor shaft, the preferred structure 18 for securing bit 20 to the shaft is a collet type system. The collet bit attachment system includes a collet nut and a collet centered axially within a central aperture of the collet nut. The collet nut is mounted on a threaded end of the motor shaft. To secure bit 20 to the motor shaft, a shank of bit 20 is inserted into the central aperture of the collet. The collet nut is then tightened, first by hand, and then with a wrench 22, until bit 20 is held securely. As the collet nut is tightened down on the threaded end of the shaft, the collet is compressed within the collet nut between a partially closed end of the collet nut and the shaft. The collet is slotted and has tapered ends, such that when the collet is compressed between the collet nut and the shaft the collet is compressed radially, causing the central aperture of the collet to close tightly around the shank of cutting tool bit 20. To remove bit 20 from the motor shaft, the collet nut is loosened, using the wrench 22, until bit 20 can be easily removed from the central aperture of the collet.

A shaft lock pin may be used to prevent rotation of the motor shaft when the collet nut is being loosened and tightened. The shaft lock pin (not shown) may extend through motor housing 14. When the shaft lock pin is depressed, it engages the motor shaft, preventing rotation of the shaft, and allowing the collet nut to be loosened and tightened. When the shaft lock pin is released, a spring attached to the shaft lock pin causes the shaft lock pin to become disengaged from the motor shaft, allowing free rotation thereof.

A handle 24 may be securely attached to motor housing 14 of cutting tool 10. Handle 24 is preferably made of an electrically insulating material, such as hard plastic, by a conventional process, such as molding. Handle 24 also includes a gripping surface 26 which is preferably contoured in shape so that the handle 24 may be grasped comfortably in the hand of an operator of cutting tool 10. Handle gripping surface 26 is preferably aligned substantially parallel with the axis of motor housing 14. Handle 24 allows cutting tool 10 to be grasped firmly and comfortably with two hands, one hand grasping handle 24 with the other hand grasping motor housing 14, to provide greater control of cutting tool 10 during operation, and thereby to provide for more accurate cuts with less operator fatigue. Handle 24 also allows cutting tool 10 to be grasped more firmly during motor start-up, during which the reaction torque of the cutting tool motor may cause tool 10 to twist. Thus, cutting tool handle 24 also facilitates safe use of cutting tool 10.

It may be desirable, however, that cutting tool handle 24 be detached for some applications. For example, for use of tool 10 in close quarters or obstructed areas, handle 24 may become an obstruction, and actually interfere with accurate use of tool 10. Thus, handle 24 is preferably made detachable from cutting tool 10 when its use would interfere with accurate and safe operation of cutting tool 10. For example, handle 24 may be securely, but detachably, attached to cutting tool 10 at the ends thereof using threaded locking knobs 28 which are inserted through mounting holes 30 formed in the ends of handle 24 and into corresponding threaded holes 32 formed in lugs 34 attached to and extending from cutting tool motor housing 14. (Note that mounting holes 30 may be formed in a removable insert piece 36 which may be inserted into one or both of the ends of handle 24 before handle 24 is mounted on handle lugs 34. Insert pieces 36 of different sizes may be used to allow a detachable handle 24 of a given size to be attached to various different cutting tools 10 having slightly different sizes and shapes.) To detach handle 24 from motor housing 14, locking knobs 28 are loosened and removed from handle 24, and handle 24 is pulled away from motor housing 14.

As will be discussed in more detail below, an automatic locking depth guide 12 in accordance with the present invention may be mounted in a detachable handle 24 for attachment to motor housing 14 of a Spiral Saw™ cutting tool 10 or other hand-held power tool. In such a case, in particular, it is important that detachable handle 24 be very securely attachable to motor housing 14. Thus, detachable handle 24 also includes an attachment collar 38 which is preferably shaped and sized to extend snugly around a portion of motor housing 14. For example, as illustrated in FIGS. 1 and 2, attachment collar 38 may be formed extending from a lower portion of detachable handle 24 to extend snugly around a lower portion of motor housing 14, near the position where the motor shaft extends from the motor housing, when detachable handle 24 is in position on motor housing 14. An expansion slot 40 formed in attachment collar 38 allows extending attachment portion 38 to be expanded slightly to fit around motor housing 14. A locking knob 28 includes a threaded shaft which extends through threaded apertures 42 which are formed in attachment collar 38 on opposite sides of expansion slot 40. Locking knob 28 may thus be tightened in apertures 42 to close expansion slot 40, thereby bringing the sides of attachment collar 38 together to secure the attachment collar 38 of detachable handle 24 tightly around motor housing 14, thereby also securely attaching handle 24, with depth guide 12 mounted therein, to cutting tool 10.

One or more storage compartments 44 may be formed in detachable handle 24 in a conventional manner, e.g., by molding into the design of handle 24. One of the handle storage compartments 44 may be specifically designed to hold a wrench 22 which is used for tightening and loosening the mechanical structure 18 for attaching cutting tool bits 20 to the cutting tool 10, as described above. An aperture 45 in the handle 24 provides access to the wrench compartment 44. The size of compartment 44 is such that wrench 22 is held snugly therein, to prevent it from sliding out during operation of the cutting tool 10. As illustrated in FIG. 1, a portion 46 of handle 24 is reduced in width such that, when the wrench 22 is placed in the compartment 44, the head of the wrench extends slightly from the sides of handle 24. This permits the head of the wrench 22 to be grasped to pull the wrench 22 from compartment 44. Other compartments may also be formed in handle 24 in a conventional manner.

A first embodiment of the automatic locking depth guide 12 in accordance with the present invention will now be described in further detail with reference to FIGS. 1 through 5. Automatic locking depth guide 12 includes a depth guide base 50, a depth guide shaft 52 attached to the base 50, and an automatic locking and release mechanism 54 coupled to the shaft 52.

Depth guide base 50 is preferably made of a strong, rigid material, for example, machined from a piece of steel or aluminum. Alternatively, depth guide base 50 may be formed from a polymeric material such as polyethylene or polypropylene. Depth guide base 50 includes a substantially flat bottom surface 55. In use, the bottom surface 55 of the depth guide base 50 is positioned against a work piece being cut as cutting tool 10 is moved along the work piece. Therefore, bottom surface 55 of depth guide base 50 is preferably smooth, such that bottom surface 55 of depth guide base 50 and, therefore, tool 10 attached thereto, slides easily across a work piece during use.

Depth guide base 50 is sized and shaped such that depth guide base 50 provides a broad and stable base for tool 10 to which depth guide 12 is attached. For example, the depth guide base 50 is preferably generally planar and elongated in shape (as illustrated). A large aperture 56 is formed through the depth guide base 50 at or near one end of elongated base 50. Aperture 56 is positioned on depth guide base 50 such that, when the depth guide 12 is attached to the cutting tool 10, a cutting bit, such as cutting tool bit 20, may be extended down through aperture 56 below bottom surface 55 of depth guide base 50 into a work piece to be cut. Aperture 56 may be of any shape or size as desired, provided that aperture 56 is sufficiently large so as not to interfere with operation of cutting tool 10 to which it is attached. Depth guide base 50 may entirely surround aperture 56 (as shown), but need not.

Depth guide shaft 52 is attached to depth guide base 50 at or near the opposite end thereof from depth guide base aperture 56. Depth guide shaft 52 preferably extends at a right angle from the depth guide base 50. Depth guide shaft 52 is preferably also made of a strong and rigid material, such as steel or aluminum and may be attached to depth guide base 50 in a conventional manner, such as via welding, or by the use of fasteners, etc.

Depth guide shaft 52 is coupled to and automatic locking and release mechanism 54. The automatic locking and release mechanism 54, along with shaft 52, is, in turn, attached to a hand-held power tool, such as Spiral Saw™ cutting tool 10, such that bottom surface 55 of the depth guide base 50 is perpendicular to the axis of cutting tool 10 and the cutting tool bit 20, attached to tool 10 is aligned with aperture 56 in base 50. In accordance with the present invention, the automatic locking and release mechanism 54 may be mounted within detachable handle 24, such that the depth guide shaft 52 extends therefrom. In this manner, the depth guide 12 is attached to the cutting tool 10 by attaching detachable handle 24 to the motor housing 14 of the cutting tool 10, as described above, and is removed from the tool 10 by removing the handle 24. Depth guide base 50 is attached to the end of the depth guide shaft 52 extending from detachable handle 24 such that when the detachable handle 24 is attached to the motor housing 14, the depth guide base aperture 56 is aligned with the end of cutting tool 10 from which the motor shaft extends, and to which a cutting bit, e.g., cutting tool bit 20, may be attached. The automatic locking and release mechanism 54 and depth guide shaft 52 are mounted in the detachable handle 24 such that when the detachable handle 24 is attached to the motor housing 14 of cutting tool 10, and the depth guide shaft 52 extends substantially parallel to the axis of cutting tool 10, and depth guide base 50 is thus positioned substantially perpendicular to the axis of cutting tool 10. It should be understood that depth guide 12 may be attached in other ways to cutting tool 10. For example, depth guide 12 may be mounted in a handle 24 for cutting tool 10 which is permanently attached thereto, rather than removable. Alternatively, the depth guide 12 may be attached to the cutting tool 10 by mounting the automatic locking and release mechanism 54 and depth guide shaft 52 within an extending portion of tool housing 14, such that the depth guide shaft 52 extends therefrom and the aperture 56 in depth guide base 50 is properly positioned with respect to a cutting bit mounted to cutting tool 10.

The depth guide shaft 52 may be mounted in handle 24 so as to be slidably movable therein. For example, the depth guide shaft may be mounted in a chamber 57 formed in the handle 24 to extend from an aperture in the end thereof. Chamber 57 may be formed in a conventional manner, e.g., by defining chamber 57 during molding of plastic handle 24. At least one, and preferably two, bushings 58 and 60 may be provided in the chamber 57 formed in the detachable handle 24, to support the depth guide shaft 52 for slidable movement therein. Bushings 58 and 60 are preferably made of a strong and rigid material, such as brass, steel or aluminum, and may be mounted in chamber 57 formed in handle 24 in any conventional manner. For example, when handle 24 is made of a molded plastic material, appropriate recesses may be molded into handle 24 adjacent to chamber 57 to support bushings 58 and 60 in position.

The depth guide shaft 52 is preferably biased in an extending direction, i.e., outward from handle 24. This may be accomplished by use of a compression spring 62 which may be mounted in a conventional manner within the chamber 57 formed in the handle 24 to bias depth guide shaft 52 in the extending direction from the chamber 57. For example, a lower end of the compression spring 62 may be mounted within a central aperture 63 formed in the depth guide shaft 52. The upper end of the spring 62 extends outward from the top end of the depth guide shaft 52 to rest against a seat 64 formed on the inside top of the chamber 57 formed in the handle 24.

Movement of the depth guide shaft 52 in an extending direction, outward from the handle 24, and in a retracting direction, into the handle 24, moves the depth guide base 50 attached thereto away from and toward the tool 10 to which depth guide 12 is attached, respectively. Thus, movement of the depth guide shaft 52 is used to adjust the depth guide 12 to set a desired depth of cut.

Movement of the depth guide shaft 52 outward from handle 24, in an extending direction, is limited such that the depth guide shaft 52 does not come out of the end of the handle 24. Extending movement of the depth guide shaft 52 may be limited, for example, by use of a ring 66 mounted to extend radially from, e.g., a notch 68 formed around the depth guide shaft 52. As the depth guide shaft 52 is moved in the extending direction, out of the handle 24, ring 66 contacts a stop, e.g., provided by the bushing 58, which prevents further extending movement of the depth guide shaft 52 beyond a maximum extension. The depth guide shaft 52 is allowed to extend from the handle 24 by a sufficient distance such that when the depth guide shaft 52 is fully extended, a cutting bit, such as a cutting tool bit 20, mounted on cutting tool 10 to which depth guide 12 is attached, does not extend below bottom the surface 55 of the depth guide base 50. Thus, when the depth guide shaft 52 is fully extended, the tool 10 to which depth guide 12 is attached may be stood upright on the depth guide base 50, even with a bit 20 attached to the tool 10. In this fully extended position of the depth guide shaft 52, there is no depth of cut, since bit 20 does not extend below bottom surface 55 of depth guide base 50.

Movement of the depth guide shaft 52 into the handle 24, in a retracting direction, is ultimately limited by either the top end of the depth guide shaft 52 contacting the upper surface 64 of the chamber 57 formed in the handle 24, in which shaft 52 is mounted, or by a bottom portion of the handle 24 contacting an upper surface of depth guide base 50. This fully retracted position of the depth guide shaft 52 represents the maximum possible depth of cut for a cutting tool bit 20 of a given length.

In accordance with the present invention, a depth adjustment mechanism is provided for establishing one or more intermediate depths of cut between the maximum and minimum (no cut) depths of cut defined by the maximum distance of travel of the depth guide shaft 52 in handle 24. An exemplary mechanism for providing such depth of cut adjustment includes a depth adjustment screw 70 in combination with a depth adjustment stop 72. The depth adjustment screw 70 may be a mounted in a chamber 71 formed in the handle 24 to run parallel with the depth guide shaft 52. A portion of the depth adjustment screw 70 extends from a bottom portion of the handle 24, preferably near the location where the depth guide shaft 52 extends from the handle 24. The depth adjustment screw 70 is preferably implemented as a threaded rod which is held in the handle 24 by the threading depth adjustment screw 70 through the central aperture of a first nut 74 which is mounted in position in handle 24. First nut 74 is mounted in handle 24 to extend therefrom and in a manner such that the first nut 74 may be rotated therein. A second nut 76 is threaded onto the portion of the depth adjustment screw 70 which extends outside of the handle 24. Both the first 74 and second 76 nuts preferably have a rounded outer circumference with knurling formed thereon to allow the first 74 and second 76 nuts to be adjusted by hand without slipping. Rotation of the depth adjustment screw 70 in handle 24 is prevented, e.g., by a flattened side of the depth adjustment screw 70 which is positioned against an appropriate structure molded into the handle 24 to prevent rotation of the screw 70, but which allows movement of the screw 70 in a direction in and out of the handle 24. Thus, by operation of the first 74 and second 76 nuts, the amount by which depth adjustment screw 70 extends from handle 24 may be set. For example, by rotating the first nut 74, the amount by which the depth adjustment screw 70 extends from the handle 24 is adjusted. Once the depth adjustment screw 70 is extended from the handle 24 by the appropriate amount, to define a desired depth of cut, the second nut 76 is tightened by hand against the bottom surface of the handle 24. The second nut 76 thus forms a lock nut for locking the depth adjustment screw 70 in a desired position.

The depth adjustment stop 72 is attached to the depth guide base 50 and/or depth guide shaft 52 (or is formed as a portion thereof) and is positioned thereon to contact the depth adjustment screw 70 when the depth guide shaft 52 is moved in a retracting direction, into the handle 24, to prevent further movement of the depth guide shaft 52 in a retracting direction beyond a selected amount. The depth adjustment stop 72 may take any form which performs this function.

The depth adjustment stop 72 may be formed as a flattened ring positioned around the base of the depth guide shaft 52, adjacent to the depth guide base 50. The depth adjustment stop 72 may thus extend radially from the base of the depth guide shaft 52 a sufficient distance such that when the depth guide shaft 52 is pushed up into handle 24, in the retracting direction, the depth adjustment screw 70 is brought down into contact with a portion of the depth adjustment stop 72 to prevent further movement in this direction. The depth adjustment stop 72 may preferably be mounted for rotational movement with respect to the depth guide shaft 52. Thus, the depth adjustment stop 72 may be rotated about the shaft 52 to align a selected one of a plurality of depth stop positions with depth adjustment screw 70. As illustrated, each depth stop position may be formed as an extension 78 extending radially from depth adjustment stop 72. (Downward movement of the handle 24 with respect to depth guide base 50 is stopped when the bottom of the depth adjustment screw 70 contacts an extending portion 78 of the depth adjustment stop 72.) The depth adjustment stop 72 may be formed with detents in a conventional manner, such that there is increased resistance to rotation of the depth adjustment stop 72 when a selected one of the depth adjustment stop extending portions 78 (depth stop positions) is aligned with the depth adjustment screw 70, (thus, depth adjustment stop 72 will not rotate unintentionally from such a position). Each extending portion 78 of depth adjustment stop (depth stop position) 72 may preferably include a threaded aperture 80 formed therein. A screw 82, or other structure, may be threaded into the aperture 80 in the extending portion 78 (depth stop position) of the depth adjustment stop 72 to extend therefrom toward the depth adjustment screw 70. The screw 82, or other structure, may be adjusted to extend a selected distance from the depth adjustment stop 72. When the depth adjustment stop 72 is moved into a position such that an extending portion 78 (depth stop position) with a screw 82 or other structure extending therefrom is aligned with depth adjustment screw 70, retracting movement of depth guide shaft 52 will be limited by the depth adjustment screw 70 contacting the screw 82. A plurality of such screws 82 or other structures, threaded into apertures 80 formed in multiple extending portions 78 (depth stop positions) of depth adjustment stop 72, may be employed and adjusted to extend various distances from the depth adjustment stop 72. By rotating the depth adjustment stop 72 to align selected ones of the screws 82 or other structures extending therefrom with the depth adjustment screw 70, the depth adjustment stop 72 may be used to define multiple depths of cut, without adjusting the depth adjustment screw 70. For example, for a depth adjustment screw 70 set to extend from handle 24 by a selected distance, different depths of cut, i.e., different maximum retracting distances of depth guide shaft 52, may be defined by the use of multiple screws 82 or other structures extending different distances from apertures 80 formed in extending portions 78 (depth stop positions) of depth adjustment stop 72. A desired depth of cut may be set by rotating depth adjustment stop 72 into a position to align the extending portion 78 (depth stop position) which defines the desired depth of cut with depth adjustment screw 70.

In accordance with the present invention, the depth of cut to be made by a Spiral Saw™ cutting tool, or other hand-held power tool, to which the depth guide 12 is attached, is established by moving the depth guide shaft 52 in a retracting direction until further movement of the shaft is prevented by the depth adjustment screw 70 contacting the depth adjustment stop 72. In accordance with the present invention, movement of the depth guide shaft 52 in the extending direction is automatically prevented when the depth guide is moved into such a position. In other words, in accordance with the present invention, the depth guide shaft 52 is automatically locked into position when the depth guide shaft 54 is moved into a desired position to establish a desired depth of cut. The automatic locking and release mechanism 54, coupled to the depth guide shaft 52, performs this function.

In accordance with the present invention, the automatic locking and release mechanism 54 automatically locks the depth guide shaft 52 into a locked position when a depth of cut is selected by preventing movement of the depth guide shaft 52 in an extending direction while allowing movement of depth guide shaft 52 in a retracting direction. This may be accomplished by use of a locking pin 84, rod, or dowel, which is mounted in a slot 86 formed at an angle to the depth guide shaft 52 and adjacent thereto. The pin 84 may be formed, e.g., as a short metal rod. The slot 86 may be formed, as shown, in one of the bushings 60 used to support depth guide shaft 52 in chamber 57 formed in handle 24. Alternatively, the slot 86 may be formed, e.g., in a molded structure formed in the chamber 57 itself. The slot 86 is formed so as to angle toward depth guide shaft 52 near the bottom thereof and to angle away from depth guide shaft 52 near the top thereof. The pin 84 is positioned in the slot 86 such that the axis of the pin 84 is oriented perpendicularly to the axis of the depth guide shaft 52. The slot 86 is positioned with respect to the depth guide shaft 52 such that the pin 84 contacts a surface of the depth guide shaft 52 when the pin 84 is positioned toward the bottom of the slot 86. Preferably, the portion of the depth guide shaft 52 which is adjacent to and in contact with the pin 84 is flattened, to increase the surface area of contact between the pin 84 and the depth guide shaft 52 when the pin 84 is in contact with the depth guide shaft 52. The pin 84 is biased downward in the slot 86, i.e., toward the bottom of slot 86, which is angled toward the depth guide shaft 52. Thus, the pin 84 is biased against the flattened portion of the depth guide shaft 52. The pin 84 may be biased into this position by operation of, for example, a compression spring 88 mounted in a chamber 90 formed in handle 24. The chamber 90 may be formed in the handle 24 in a conventional manner, e.g., during the process of molding plastic handle 24. The biasing spring 88 may be coupled to the pin 84 by a linkage 92.

As the depth guide shaft 52 is moved in a retracting direction, into the handle 24, the pin 84 is pushed upward in the slot 86 by the shaft 52, against the bias provided by the spring 88 via the linkage 92. As the pin 84 moves upward in the angled slot 86, it is moved away from the depth guide shaft 52. Thus, the depth guide shaft 52 is allowed to move freely in the retracting direction to move the tool 10 to which the depth guide 12 is attached downward, toward the depth guide base 50. When the retracting movement of the depth guide shaft 52 is completed, e.g., when the depth guide shaft 52 is moved in a retracting direction until the depth adjustment screw 70 contacts the depth adjustment stop 72, the pin 84 is biased downward in the angled slot 86 by the spring 88, against the flattened portion of the depth guide shaft 52. In this position, the pin 84 prevents movement of the depth guide shaft 52 in an extending direction. Thus, the depth guide shaft 52 is automatically locked into a desired position by the locking mechanism formed by the pin 84 mounted in the angled slot 86 and biased against the depth guide shaft 52 by the spring 88 and the linkage 92. No knobs or other manual mechanism need be tightened to lock the depth guide shaft 52 into the desired position.

The depth guide shaft 52 is preferably released from the locked position by actuation of a release switch 94. Release switch 94 is preferably mounted on the detachable handle 24 and projects therefrom in a position which is easily operable by an operator of the tool 10 to which the depth guide 12 is attached. For example, release switch 94 may be positioned on the handle 24 so as to be easily operable by the thumb of an operator grasping the tool 10 by the handle 24. The release switch 94 may be mounted in the handle 24 in a conventional manner for, e.g., sliding, or other movement therein. The release switch 94 is coupled to the pin 84 such that when the release switch 94 is actuated, the locking pin 84 is pulled upward in the angled slot 86, i.e., away from depth guide shaft 52. This releases the depth guide shaft 52 from the locked position, i.e., allowing extending movement of the depth guide shaft 52. The release switch 94 may be coupled to the locking pin 84 in a conventional manner. For example, as illustrated, a lever 96 mounted in detachable handle 24 may be used to couple the release switch 94 to the linkage 92 which, as discussed above, is coupled to locking pin 84.

An automatic locking depth guide in accordance with the present invention may be used to easily and rapidly establish a desired depth of cut for a Spiral Saw™ cutting tool, or other hand-held power tool, in the following manner. A cutting bit, e.g., a cutting tool bit 20, is attached to tool 10 in the manner described above. The depth guide 12 is also attached to the tool 10, as described above. With the depth guide shaft 52 in an extended position, the lock nut 76 mounted on the depth adjustment screw 70 outside of the handle 24 is loosened. The other nut 74 mounted on the depth adjustment screw 70 is then turned until the depth adjustment screw 70 extends from the handle 24 by a desired amount. The nut 76 is then tightened against the handle 24, to lock the depth adjustment screw 70 in the desired position. The depth adjustment stop 72 is then positioned such that an extending portion 78 thereof (a depth stop position) is aligned with the depth adjustment screw 70. If a screw 82 or other structure is positioned in an aperture 80 formed in the extending portion 78 of depth adjustment stop 72, then the screw 82 may be adjusted to a desired height. Screws 82 or other structures mounted in the other extending portions 78 (depth stop positions) of the depth adjustment stop 72 may be set to other desired heights. The depth guide shaft 52 is then moved in a retracting direction, e.g., by moving the tool 10 toward the depth guide base 50, until the depth adjustment screw 70 contacts the depth adjustment stop 72. By action of the automatic locking and release mechanism 54, the depth guide shaft 52 will automatically lock into this position. The tool operator may then verify that the cutting bit 20 extends by a desired distance below the bottom surface 55 of the depth guide base 50. This distance is the depth of cut which is set by the particular combination of the depth adjustment screw extension and depth stop position selected. The depth adjustment shaft 52 may then be released from the locked position by actuation of the release switch 94. By action of the compression spring 62, the depth guide shaft 52 will be extended once again into the fully extended position. The depth adjustment screw 70 and/or screw 82 or other structure mounted in the depth adjustment stop 72 may then be adjusted to fine tune the desired depth of cut. This process may be repeated until one or more desired depths of cut are established using the depth adjustment screw 70 and screws 82 or other structures mounted in the depth adjustment stop 72. Gradation markings 98 may be provided, e.g., on the depth guide shaft 52 (see FIG. 5), to assist the operator in this process of establishing one or more desired cut depths.

Having pre-defined desired depths of cut using the depth adjustment screw 70 and the depth adjustment stop 72, the cutting tool 10 or other hand-held power tool to which the depth guide 12 is attached may be used to make a cut of the desired depth. The cutting tool motor is turned on to start rotation of cutting bit 20. The bottom surface 55 of the depth guide base 52 is then positioned against the work piece to be cut. The tool 10 is moved downward, i.e., the depth guide shaft 52 is moved in a retracting direction into the handle 24, until the depth adjustment screw 70 contacts the depth adjustment stop 72. At this point, the depth guide shaft 52 is automatically locked into the desired position, with the cutting bit 20 extending below the bottom surface 55 of the depth guide base 50 by the desired amount to make a cut of the desired depth. The tool 10 is then moved along the work piece, with the bottom surface 55 of the depth guide base 50 on the work piece, to make a cut of the desired depth into the work piece. When the cut is complete, the release switch 94 may be actuated to release the depth guide from the locked position, such that the depth guide shaft 52 is released into its fully extended position. Thus, the present invention provides a depth guide for a Spiral Saw™ cutting tool, or other hand-held power tool, in which the depth guide is locked into a position to provide a desired depth of cut automatically, without the need for e.g., manually tightening a knob, and is released from the locked position by simple actuation of the release switch 94, i.e., without the need for loosening a knob. A subsequent cut of the same depth may be made by simply moving depth guide shaft 52 into the retracted position once again. A subsequent cut of a different depth may be made by moving the depth adjustment stop 72 into another position such that another extending portion 78 (depth stop position) having a screw 82 or other structure mounted therein at a different height is aligned with the depth adjustment screw 70 before the depth guide shaft 52 is moved into the retracted position.

During use of the cutting tool 10 with the depth guide 12 attached thereto, cutting debris, e.g., sawdust and wood chips, may accumulate in and around aperture 56 formed in base 50 of depth guide 12. This is due in part to the portion of the depth guide base 50 which surrounds the point of a cut preventing such cutting debris from easily blowing away from the point of cut. Such accumulated debris near the point of a cut can obscure visibility of the point where the cutting bit 20 enters the work piece, thereby making an accurate cut using the cutting tool 10 to which depth guide 12 is attached more difficult.

Figure 6:
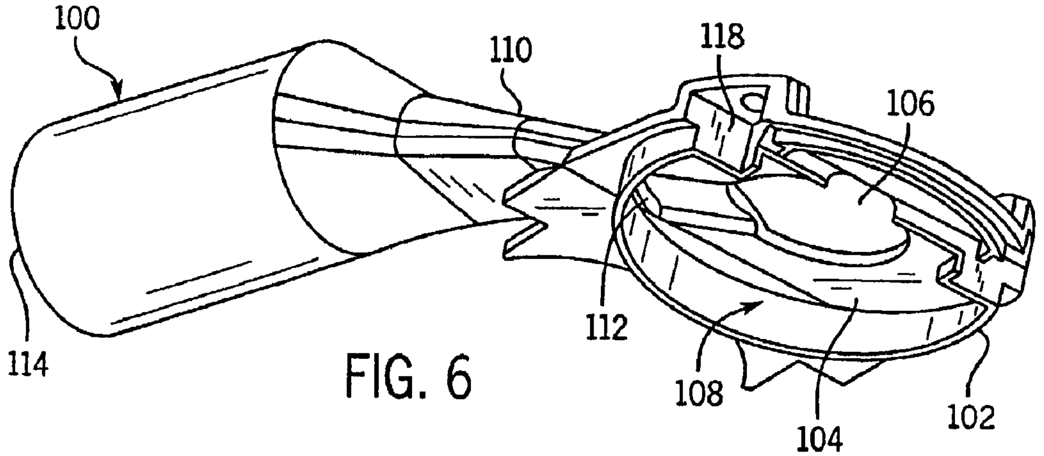
FIG. 6 is a perspective view of the underside of a dust collector attachment for use in combination with the base portion of a depth guide in accordance with the present invention.

In accordance with the present invention, a dust collector 100 is preferably provided for removing the cutting debris which may accumulate in depth guide base 50 around the point of a cut during use of the cutting tool 10. An exemplary dust collector 100 in accordance with the present invention will be described in detail with reference to FIGS. 3 and 6. Dust collector 100 to be described may preferably be formed as a single piece, in a conventional manner, e.g., of molded plastic. Dust collector 100 preferably includes an outer wall 102 which is preferably sized and shaped to fit within the depth guide base 50 around the depth guide base aperture 56. A top wall 104 is attached to a top edge of the outer wall 102. The top wall 104 has an aperture 106 formed therein which is aligned with the axis of the cutting tool 10 and which allows a cutting tool bit 20 to pass therethrough when the dust collector 100 is mounted on the depth guide base 50. The outer 102 and top 104 walls define an inner space 108 of dust collector 100. A conduit 110 is connected to the outer 102 and/or top 104 walls of the dust collector 100 and extends therefrom. Conduit 110 has an interior which is in fluid communication with the inner space 108 defined by outer 102 and top 104 walls of the dust collector 100, e.g., via an aperture 112 formed in either the side 102 or top 104 wall of the dust collector 100. The conduit 110 is adapted to have a vacuum source, e.g., vacuum hose, connected to a proximal end 114 thereof.

In use, the dust collector 100 is mounted on the depth guide base 50. The dust collector 100 is preferably removably attachable to the depth guide base 50. For this purpose, threaded apertures 116 may be formed in vertically extending portions of depth guide base 50. The dust collector 100 is positioned on the depth guide base 50 such that outer wall 102 is aligned with the aperture 56 formed in the depth guide base 50. Screws or other fasteners may be inserted through apertures 116 formed in the depth guide base 50 and into corresponding apertures, slots, or other structures 118 formed in the outer wall 102 of the dust collector 100, to secure the dust collector 100 to the depth guide base 50.

When the tool 10, with the depth guide 12 and dust collector 100 attached thereto, is used to make a cut, the inner space 108 of the dust collector 100 which is defined by outer 102 and top 104 walls thereof will be closed at least partially by the work piece positioned against the bottom surface 55 of the depth guide base 50. Saw dust or other debris will collect in the space 108, being prevented from blowing around a work space by the outer 102 and top 104 walls and the dust collector 100. Cutting debris is removed from the space 108 via aperture 112 and conduit 110 by a conventional vacuum source (not shown) attached to the proximal end 114 of dust collector conduit 110. Thus, the dust collector 100 may be used to remove cutting debris from the point of a cut when a tool 10 with a depth guide 12 attached thereto is in use, thereby to improve the operator's ability to see the point where cutting bit 20 enters a work piece, thereby to make a more accurate cut.

It should be understood that a dust collector in accordance with the present invention may be used in combination with any depth guide or other hand-held power tool accessory which includes a base portion which extends around the point of a cut and in which cutting debris may collect, to remove the cutting debris therefrom. Thus, it should be understood that a dust collector in accordance with the present invention is not limited to use in combination with the automatic locking depth guide 12 illustrated and described herein, or for use with the particular cutting tool 10 described, by example, herein.

While FIGS. 1–6 illustrate a first embodiment of the present invention, FIGS. 7–12 illustrate a second, preferred exemplary embodiment of a cutting tool and automatic locking depth guide in accordance with the present invention. A cutting tool 200, with an automatic locking depth guide 212 in accordance with the present invention attached thereto, is shown generally in FIGS. 7–10. The cutting tool 200 includes a motor housing 214 to which the depth guide 212 is attached. An electrical or power cord 216 is attached to the electric motor (not shown) to provide power to the cutting tool 200. The cutting tool 200 may also include a tool bit 220 attached thereto by means of a mechanical structure 218 configured for securing the bit 220 within a shaft of cutting tool 200.

Figure 7:
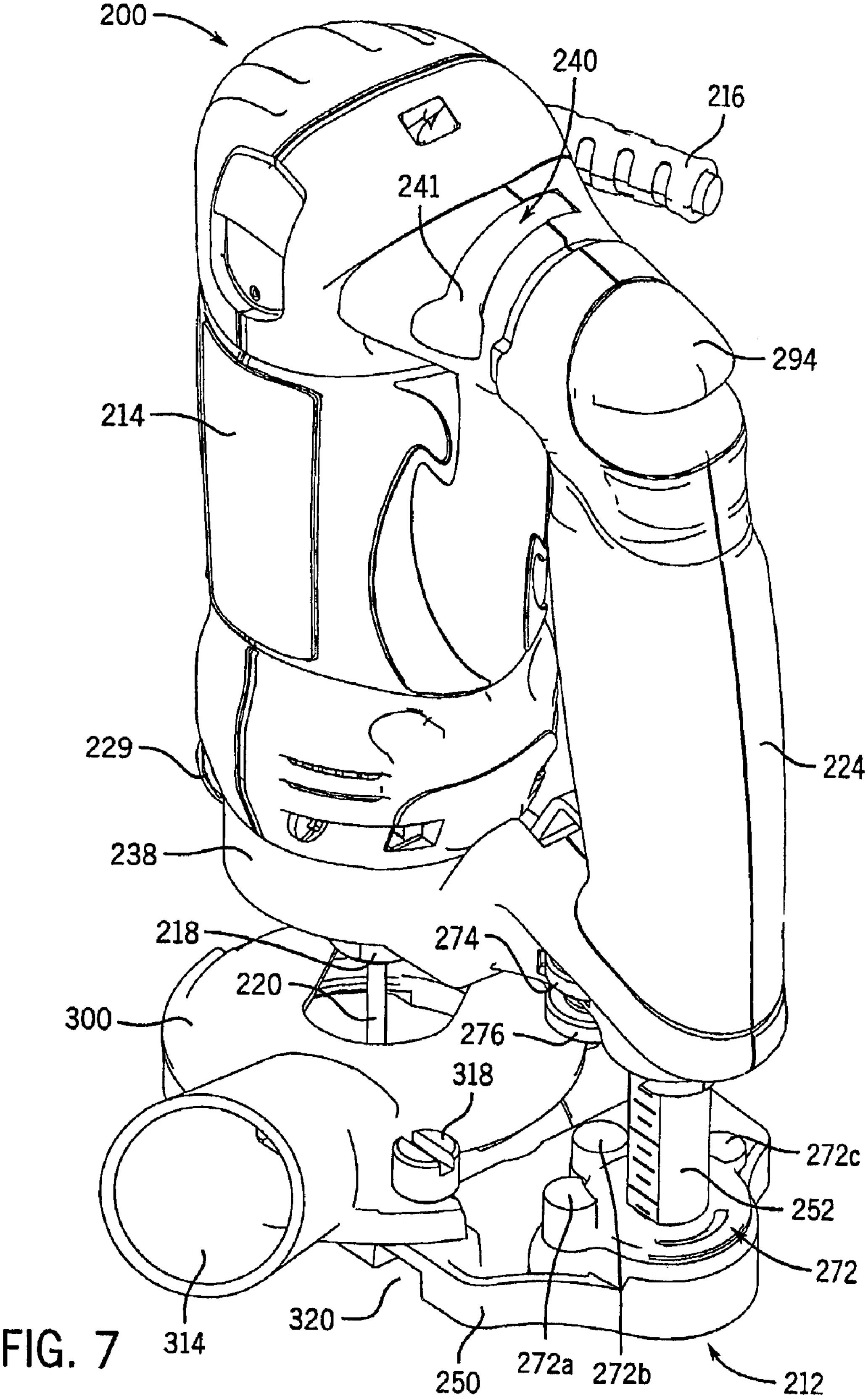
FIG. 7 is a perspective view of a Spiral Saw™ cutting tool including a preferred exemplary automatic locking depth guide in accordance with the present invention attached thereto.

The depth guide 212 includes a handle 224 and an extended attachment portion or collar 238. Handle 224 includes a mechanical fastening device 240 for removably securing the handle 224 to the motor housing 214. In one embodiment, a fastener may be used to secure the handle 224 to the motor housing 214. For example, a thumb screw (not shown) may be provided in the handle 224, and turning the thumb screw may thread the thumb screw into an aperture in the motor housing 214 to secure the handle 224 to the motor housing 214. In other embodiments, other types of fasteners (e.g., bolts, screws, pins, etc.) to removably fasten the handle 224 to the motor housing 214. As illustrated in FIG. 7, in a preferred embodiment, the mechanical fastening device 240 is a cam lock. Fastening device 240 includes a cam lock lever or handle 241 and a cam shaft (not shown) fixably coupled to the lever 241. In the closed position, the lever 241 may be received in a groove or recess in the handle 224 such that the lever 241 is flush with the surface of the handle 224. The cam shaft extends perpendicularly from the axis of motor housing 214, and mates with an aperture in the motor housing 214 to secure the handle 224 to the motor housing 214.

The handle 224 is secured to the motor housing 214 by inserting the cam shaft into the motor housing aperture and moving the lever 241 from an inclined or open position to a closed position. The cam shaft includes an end portion having an irregular shape configured for engaging a complementary shape in the interior of the aperture in the motor housing 214 when the cam shaft is rotated by moving lever 241. In an exemplary embodiment, the end portion has substantially an ovular shape. In another exemplary embodiment, the end portion may have a square cross section such that when the cam shaft is rotated, the corners of the squares engage a rib in the motor housing 214 to prevent handle 224 from being removed. In other embodiments, various shapes and designs may be used to provide secure coupling of the handle 224 to the motor housing 214. Moving the lever 241 from an open position to a closed position causes the cam shaft to rotate about its axis, which in turn causes the irregular surface to engage the aperture in the motor housing 214 and lock the handle 224 in place. Conversely, removing the handle 224 from the motor housing 214 is accomplished by moving lever 214 from a closed position to an open position to disengage the cam shaft surface from the aperture. One advantageous feature of using a cam lock as described above is that the handle 224 may be used with a variety of hand-held power tools having apertures configured to mate with the cam shaft. This allows for added flexibility of the depth guide 212, since it may be used with a plurality of tools.

The handle 224 is also secured to the motor housing 214 by the collar 238, which is shaped and sized to extend snugly around a portion of motor housing 214. The handle 224, including the collar portion 238, is formed from two clam-shell members attached to one another by fasteners 239 (shown in FIG. 10) and by a locking knob 228. Locking knob 228 is received in an aperture 212 in the collar 238, and may thread into a nut 229 or into threads incorporated in the aperture 212 itself. To attach the cutting tool 200 to the handle 224, the collar 238 is loosened by rotating the locking knob 228 counterclockwise. Loosening the collar 238 causes the two halves to part at their interface in the collar 238, which allows the cutting tool 200 to be inserted therein. After the cutting tool 200 is inserted within the collar 238, the locking knob 228 may be rotated clockwise to tighten the two halves of the collar 238 around the motor housing 214. Thus, the depth guide 212 may be securely fastened to the cutting tool 200 by first inserting the tool 200 into the collar 238 and tightening the locking knob 228 and then inserting the cam shaft in the handle 224 into an aperture in the motor housing 214 and moving the cam lock lever 241 to the closed position. Removing the depth guide 212 may be accomplished by performing these steps in reverse order. In alternative embodiments, any acceptable fastener may be used in place of the locking knob 228, such as a screw, bolt, pin, or other fastener.

Figure 8:
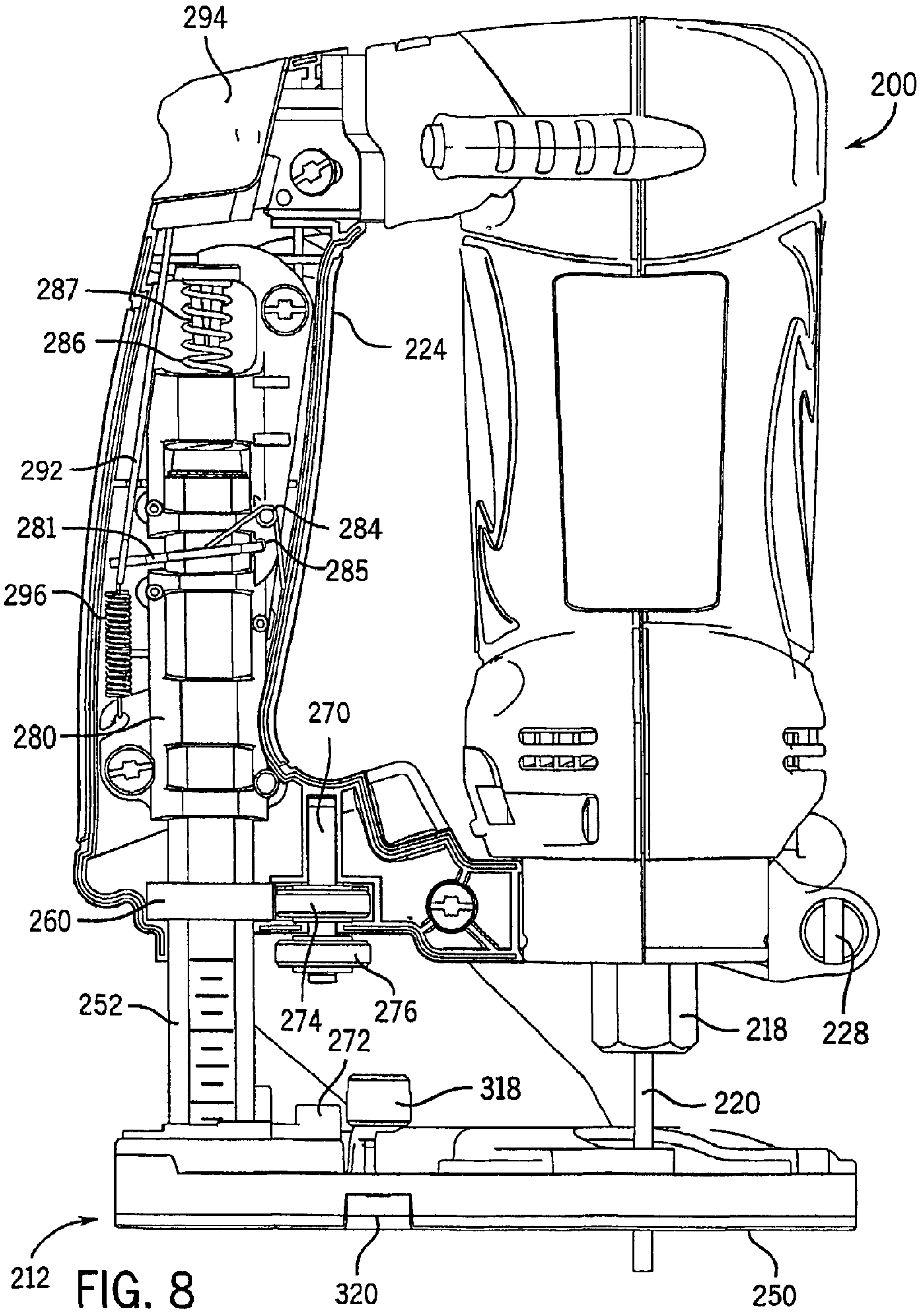
FIG. 8 is a side cutaway view of the cutting tool of FIG. 7 including a preferred exemplary automatic locking depth guide in accordance with the present invention attached thereto, with a cutting tool handle shown in cross-section to show an automatic locking and release mechanism of the depth guide mounted therein.
Figure 9:
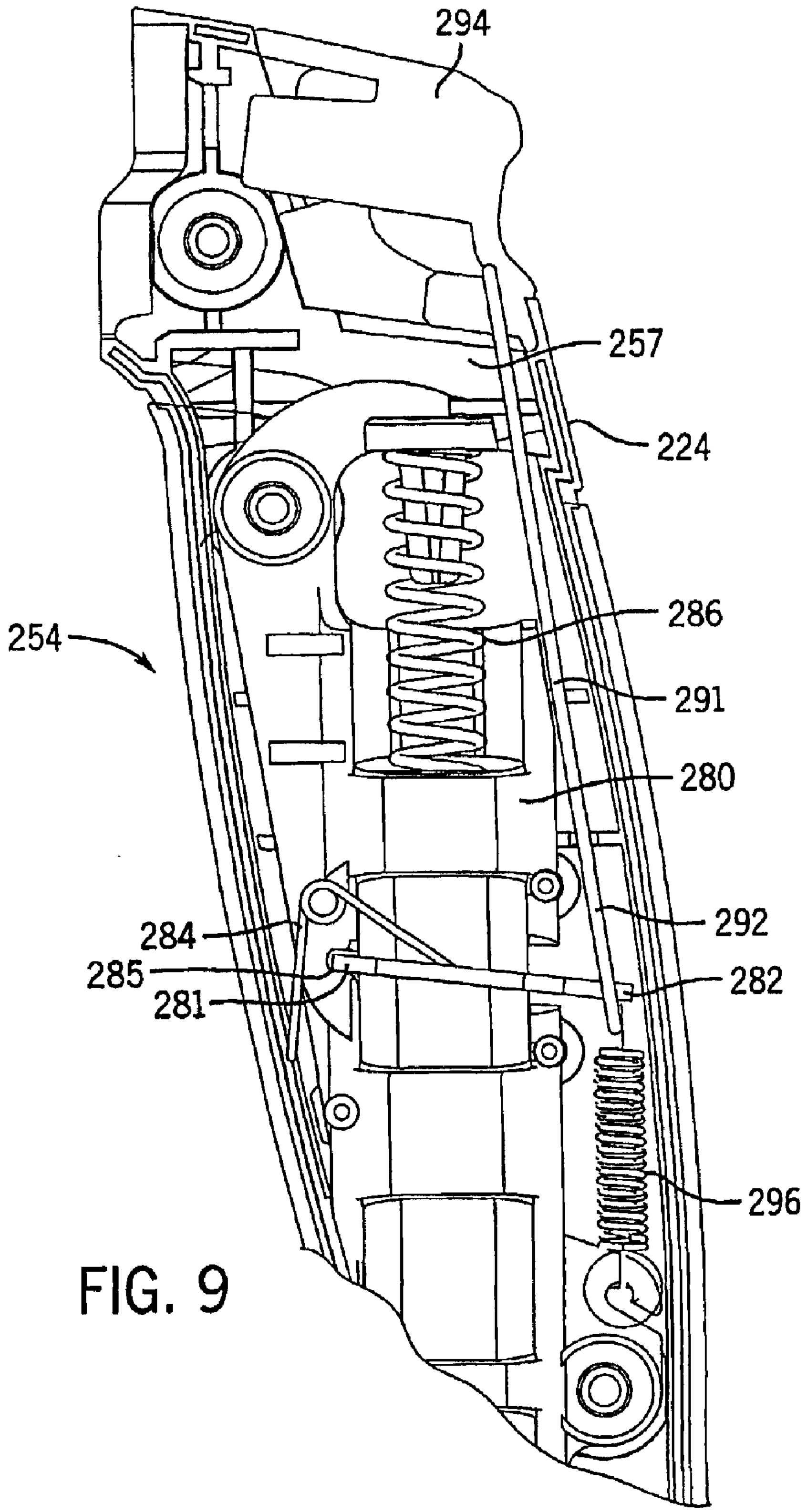
FIG. 9 is a side cutaway view of a portion of preferred exemplary cutting tool handle shown in cross-section to show an automatic locking and release mechanism of the depth guide mounted therein.

An automatic locking and release mechanism 254 included in the depth guide 212 will now be described with reference to FIGS. 8–10. A depth guide shaft 252 may be mounted within a chamber 257 in handle 224 so that the depth guide shaft 252 is movably mounted therein. A carrier 280 is provided in the handle 224 for receiving the depth guide shaft 252 therein. In an exemplary embodiment, the carrier 280 is integrally formed with the handle 224, and is made of a hard polymeric material, such as polyethylene or polypropylene. Alternatively, the carrier 280 may be made of a metallic material such as steel, aluminum, magnesium, or any suitable alloy or composite material. In another alternative embodiment, the carrier 280 may be formed separately from the handle 224 and secured within the handle 224 using any suitable fastener (e.g. bolts, pins, gluing, welding, etc.). The carrier 280 acts as a bushing for the depth guide shaft 252. Apertures provided in the carrier 280 are shaped to receive the depth guide shaft 252. In an exemplary embodiment, both the depth guide shaft 252 and the aperture include two substantially straight edges and two substantially curved or rounded edges. As the depth guide 212 is retracted, the depth guide shaft 252 moves into the carrier 280, and thus into the handle 224. As the depth guide 212 is extended, the depth guide shaft 252 moves out of the carrier 280. In this fashion, the carrier 280 provides for sliding movement of the depth guide shaft 252 within the handle 224.

To prevent dust, and other debris from entering the handle 224, a washer 260 may be provided at the bottom of carrier 280. Washer 260 is preferably sandwiched between the carrier 280 and an extending portion of handle 224. In a preferred embodiment, the washer 260 is made of felt or another fabric material. A hole in the washer 260 has a shape and size complementary to that of the depth guide shaft 252, which allows for a snug fit of the washer 260 on the depth guide shaft 252 to prevent debris from entering the handle 224 while still allowing the depth guide shaft 252 to move freely in and out of the handle 224. In addition to preventing dust and debris from entering handle 224, the washer 260 may also advantageously act to clean depth guide shaft 252 as it is moved in and out of the handle 224.

The automatic locking and release mechanism 254 automatically locks the depth guide shaft 252, and hence the depth of tool bit 220, into a locked position. In an exemplary embodiment, the depth guide shaft 252 is biased in an extending direction by a compression spring 286. The depth guide shaft 252 includes a hollow center region for receiving the compression spring 286. A pin 253 is provided near the bottom of the depth guide shaft 252 which extends through two apertures in the bottom of the depth guide shaft across the hollow center region. The compression spring 286 extends through the hollow center region and is connected to the pin 253.(e.g., by fixably attaching the spring 286 to the pin 253 or by simply allowing the spring 286 to rest on top of the pin 253). In an alternative embodiment, the depth guide shaft 252 may be a solid member and the compression spring 286 may be connected to or rest on the top of the depth guide shaft 252. In this alternative embodiment, a shorter compression spring may be used. One advantageous feature of providing a longer compression spring 286 that extends through the hollow center region of the depth guide shaft 252 to a pin 253 near the bottom of the depth guide shaft is that the spring may provide a substantially constant force throughout the entire travel of the depth guide handle 224. The compression spring 286 extends upward to engage a seating element or peg 287 in the handle 224. The seating element 287 may be integrally formed as part of the carrier 280 or may be integrally formed with the interior of the handle 224. In an alternative embodiment, the seating element 287 is not utilized, and the top of spring 286 rests against an interior surface of the carrier 280 or the handle 224.

To offset the bias of the compression spring 286 and also hold the shaft 252 in place, a locking plate 281 is provided within handle 224. Locking plate 281 also includes an extending portion 282 for engaging a locking plate release element 292. The end of the locking plate 281 opposite the extending portion 282 rests in a groove or notch 285 in the carrier 280. The locking plate 282 further includes an aperture 283 having a shape complementary to that of the depth guide shaft 252, so that the depth guide shaft 252 may freely travel through the locking plate 281 when the plane of locking plate 281 is substantially perpendicular to the axis of the depth guide shaft 252. In an exemplary embodiment, the aperture 283 is complementary to that of the depth guide shaft 252, but has a size slightly larger than the depth guide shaft 252, such that the shaft 252 does not contact all the walls of aperture 283 when locking plate 282 is perpendicular to shaft 252. In an exemplary embodiment, both the locking plate aperture 283 and shaft 252 include two substantially opposed straight sides and two opposed curved or rounded sides.

A locking plate torsion spring 284 is provided to bias the locking plate 281 in an inclined position relative to the axis of depth guide shaft 252. The torsion spring 284 is attached at one end to the carrier 280. The coiled portion of the torsion spring 284 may also engage a peg or other extension provided in the carrier 280. The free end or leg of the torsion spring 284 rests against the upper surface of the locking plate 281, and biases the locking plate 281 in an inclined position. Since one end of the locking plate 281 rests in the groove 285, this secured end acts as a fulcrum about which the locking plate 281 may rotate to its inclined position. In this inclined position, two walls of the aperture 283 come into contact with the surface of the depth guide shaft 252, producing friction that locks the depth guide 212 in a locked position. In an exemplary embodiment where the depth guide shaft 252 and aperture 283 include two opposed straight edges and two opposed rounded edges, the two rounded edges of shaft 252 and aperture 283 are in contact to provide a friction lock. The walls of the aperture 283 may either be perpendicular to the plane of the locking plate 281 or alternatively may be at an angle thereto. When the walls are at an angle to the plane of the locking plate 281, the walls may be configured to provide additional contact between the aperture walls and depth guide shaft 252 when the locking plate 281 is in an inclined position. Thus, the walls of the aperture 283 may be angled so that in the inclined, or locked, position, the entire surface of the contacting walls may contact the depth guide shaft 252. This results in additional friction to lock the depth guide shaft 252 in place.

In operation, a user of the depth guide 212 may exert a downward force to move the depth guide 212 into a retracted position in which the depth guide shaft 252 is moved into the handle 224. This downward force overcomes the force from the torsion spring 284 biasing the locking plate 281 in an inclined position. As a result, the locking plate 281 is moved to a position substantially perpendicular to the axis of the depth guide shaft 252, allowing free movement of the depth guide shaft 252 in the carrier 280 and the locking plate 281. When the applied downward force is released, the force from the torsion spring 284 again biases the locking plate 281 in an inclined position to frictionally lock the depth guide 212 in a new position. Notably, applying an external force to raise the depth guide 212 will be difficult, since pulling the handle 224 or otherwise extending the depth guide 212 will not move the locking plate 282 to a position perpendicular to the axis of the depth guide shaft 252. Thus, applying an upward force on the handle 224 will not allow the depth guide shaft 252 to move easily in the locking plate 281, since the walls of the aperture 283 will remain frictionally engaged with the depth guide shaft 252.

The depth guide shaft 252 is preferably released from the locked position by actuation of a release switch 294 mounted on the handle 224. The release switch 294 is attached to the locking plate release element 292. In an exemplary embodiment, the locking plate release element 292 is made of a metal or another such rigid material and includes a shaft portion 291 and circular end portions 293 and 297. In an alternative embodiment, locking plate release element 292 may include two shaft portions that come together in a "V" arrangement, such that the intersection of the two shaft portions serve the same function as circular end portion 293, as will be discussed below. The release element 292 is coupled to the release switch 294 by attaching the circular end portion 297 to release switch 294. The locking plate release element 292 is also attached at the bottom of the circular end portion 293 to the locking plate release spring 296. The locking plate release spring 296 is attached at the opposite end to the carrier 280 or to the interior of the handle 224, and biases the release switch 294 and locking plate release element 292 in a retracted position.

The circular end portion 293 is designed to engage the extending portion 283 of the locking plate 281 when the release switch 294 is actuated. The extending portion 283 extends through the circular end portion 293 preferably without touching the circular end portion 293. Thus, some space remains between the extending portion 283 and the bottom interior surface of the circular end portion 293. When the release switch 294 is actuated by applying an upward force on the release switch 294, such as a force from the thumb of an operator of the depth guide 212, the upward force counteracts the downward force from the locking plate release spring 296, and moves the release switch 294 and the locking plate release element 292 to an extended position. In the extended position, the bottom of the circular end portion 293 engages the extending portion 282 of the locking plate 281 and forces the locking plate 281 into a position perpendicular to the axis of depth guide shaft 252. Thus, actuating the release switch 294 counteracts both the downward force from the locking plate release spring 296 and the force from the torsion spring 284. Since no downward force is applied by the user, the compression spring 286 will force the depth guide 212 to an extended position. Upon release of the upward force applied to the release switch 294, the locking plate 281 will return to the inclined position and the depth guide 212 will be locked in position. It should be noted that the space between the bottom interior surface of the circular end portion 293 and the extending portion 282 of locking plate allows some travel in the release switch 294 before the locking plate 281 is moved to the perpendicular position. In this manner, accidental release of the depth guide 212 is prevented, since a sufficient force must be applied to the release switch 294 to cause the locking plate release element 292 to travel a sufficient distance to engage the extending portion 282 and to overcome the force of torsion spring 284.

Also in a preferred exemplary embodiment of the present invention, a depth adjustment mechanism is provided for establishing intermediate depths of cut. As described above with regard to the first embodiment, a depth adjustment screw 270 and first and second nuts 274 and 276 are provided. Rotation of first and second nuts 274 and 276 may be used to set the amount by which the depth adjustment screw 270 extends from handle 224.

As best shown in FIG. 7, also provided is a depth adjustment stop 272 having multiple raised platforms or posts **272*a*, 272*b*, 272*c* extending radially from depth guide shaft 252. Each of the raised platforms 272*a*, 272*b*, 272*c* may have a different height, to allow for multiple cutting depths. Preferably, the depth adjustment stop 272 is rotatably attached to depth guide shaft 252. Rotating the depth adjustment stop 272 may align a selected post 272*a*, 272*b*, 272*c* with the depth adjustment screw 270, such that when the depth guide 212 is retracted, the bottom of the depth adjustment screw 270 contacts the selected raised platform. By selecting one of the raised platforms 272*a*, 272*b*, 272*c* as the stop, the depth of cut may be selected without adjusting the depth adjustment screw 270**.

Figure 11:
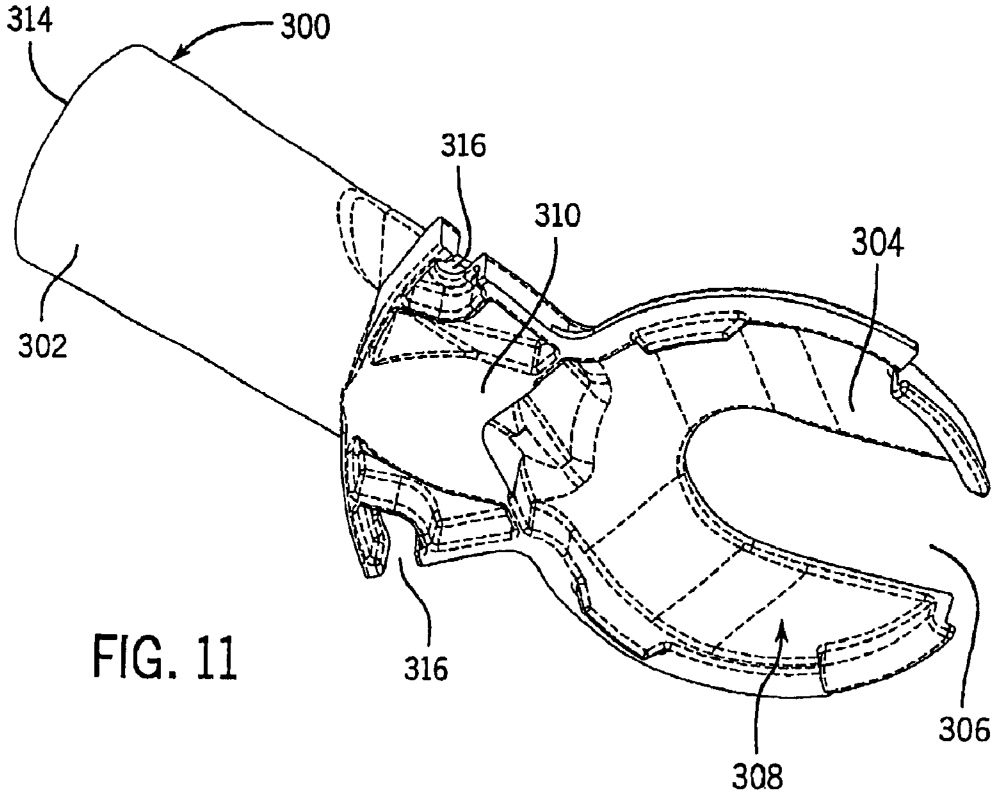
FIG. 11 is a perspective view of a dust collector used in conjunction with a preferred exemplary automatic locking depth guide in accordance with the present invention.
Figure 10:
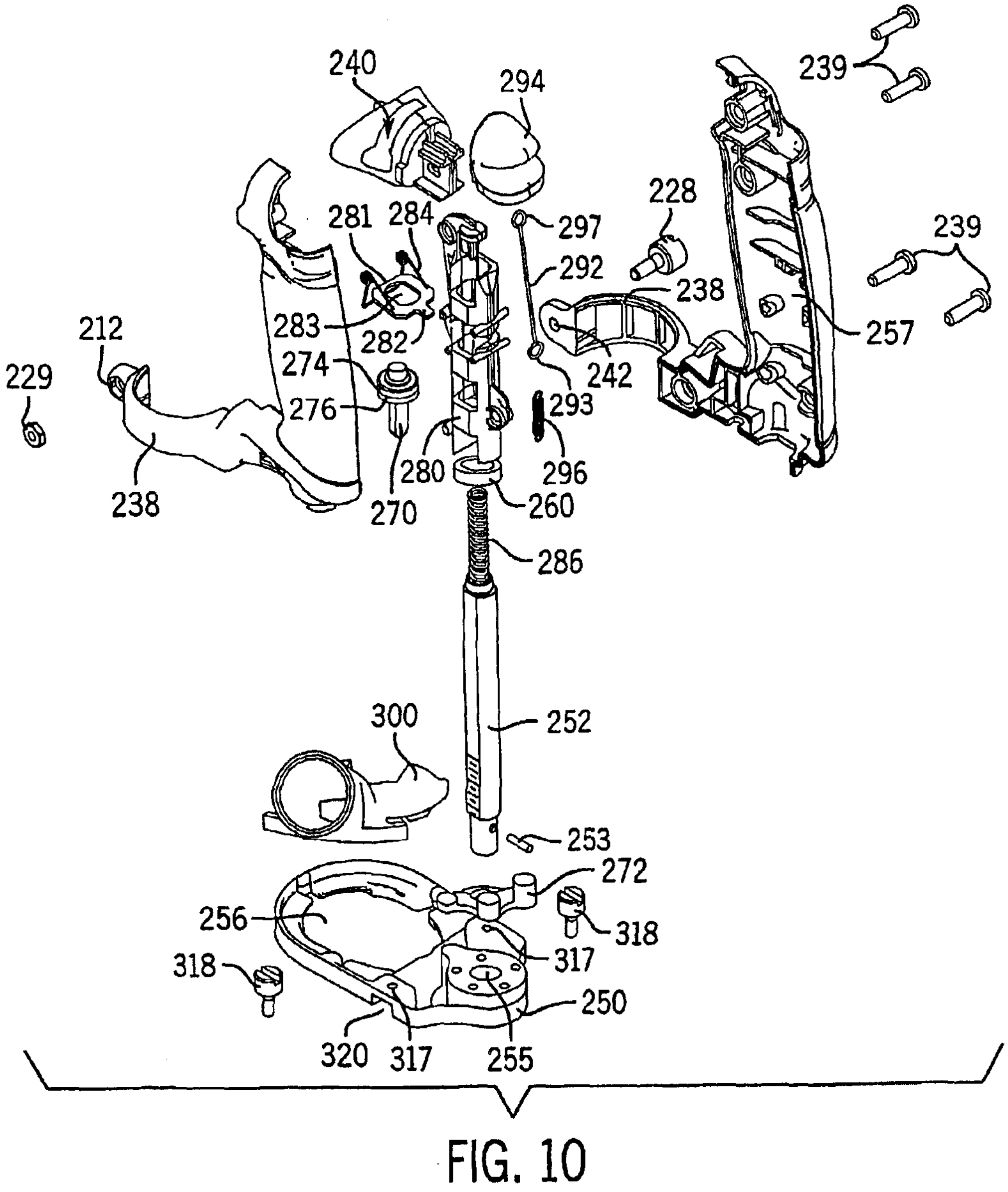
FIG. 10 is an exploded perspective view of the components of a preferred exemplary automatic locking depth guide in accordance with the present invention.

According to a preferred exemplary embodiment, a dust collector 300 may be attached to depth guide 212 for removing debris that may accumulate during the cutting operation, as illustrated in FIGS. 7, 10, and 11. The dust collector 300 is preferably molded as a single piece, and includes an outer wall 302 shaped to fit within the depth guide base 250 around the depth guide base aperture 256. The dust collector 300 also includes a top wall 304 attached to the outer wall 302 and including an aperture 306 for alignment with the axis of the cutting tool 200. The outer 302 and top 304 walls define an inner space 308 of the dust collector 300, from which a conduit 310 extends. The conduit 310 is adapted to have a vacuum source connected to a proximal end 314 thereof.

The dust collector 300 may preferably be affixed to the depth guide base 250 on either side of rotary cutting tool 200. An aperture 316 for receiving a fastener 318 such as a screw, pin, locking knob, or other acceptable fastener is provided in the dust collector 300 on each side of the conduit 310. The fastener 318 is inserted through the aperture 316 and through a comparable aperture 317 in the depth guide base 250 to lock the dust collector 300 in place. The dust guide base 250 includes an aperture 317 on each side of the depth guide base 250. Preferably, the dust collector 300 is symmetrical, so that the dust collector 300 may be mounted to either side of the depth guide base 250, depending on the need of the operator. For example, an operator may find that for a particular application, a dust collector mounted on the left side of the rotary cutting tool 200 is preferred. The operator may remove the dust collector 300 from the right side of cutting tool 200 by removing fastener 318. Dust collector 300 may then be positioned on the left side of rotary cutting tool 200 and secured by inserting the fastener 318 through the apertures 316 and 317 and tightening the fastener 318.

Figure 12:
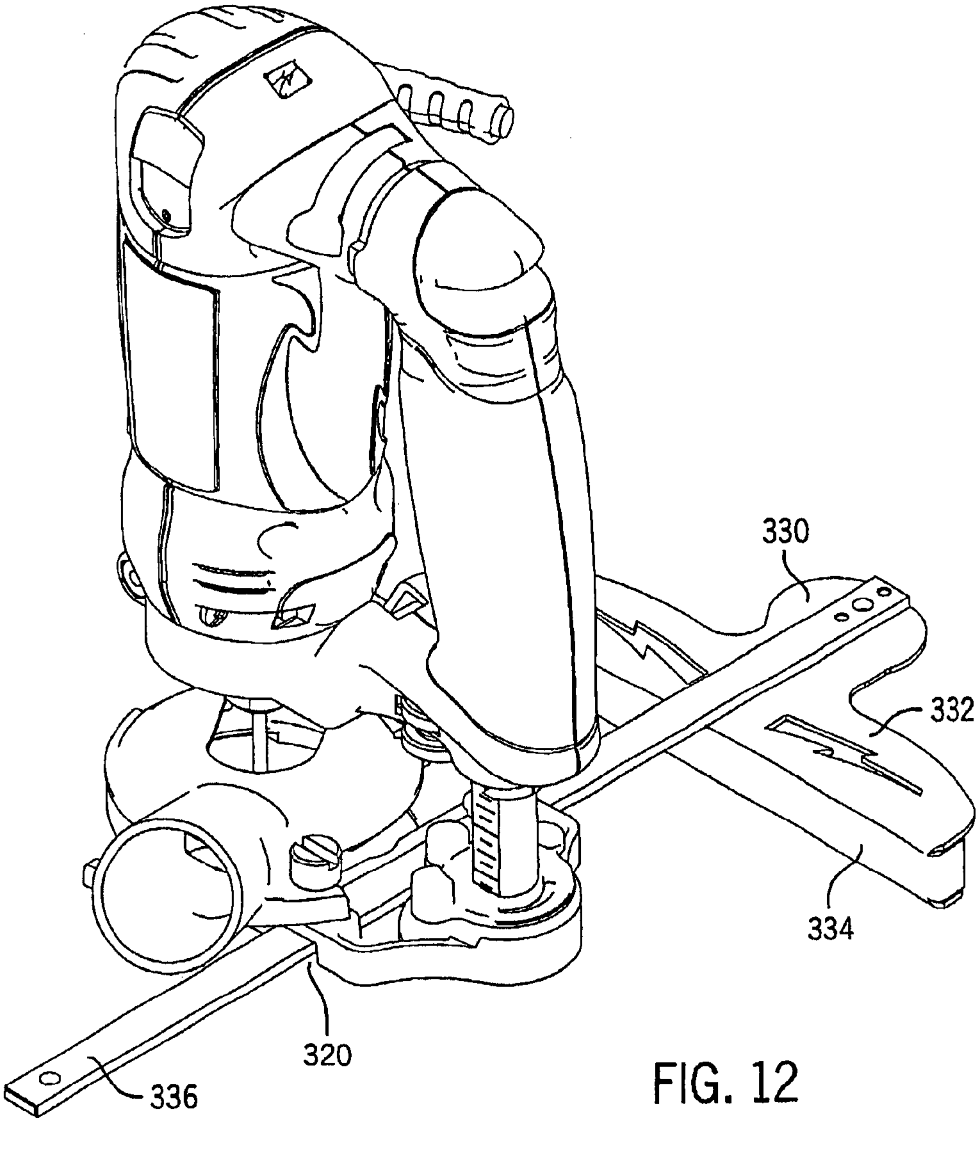
FIG. 12 is a perspective view of a Spiral Saw™ cutting tool including a preferred exemplary automatic locking depth guide, a dust collector, and an edge guide in accordance with the present invention attached thereto.

As shown in FIG. 12, an edge guide 330 may be used in conjunction with depth guide 212. The edge guide 330 includes a shaft 336 and a body portion 332. The body portion 332 is fastened to the shaft 336 and includes a face 334 for sliding along an edge of a workpiece to allow an operator to cut straight lines in the workpiece. To use the edge guide 330, an operator may slide the shaft 336 into a slot or opening 320 in depth guide base 250. The opening 320 may include a series of extensions or bridges (not shown) that are formed in depth guide base 250 and provide support for shaft 336. The shaft 336 may be inserted into the opening 320 a set distance, which may correspond to the distance from the end of the workpiece that a cut will be made by the tool 200. The distance from the face 334 to the bit 220 along shaft 336 defines the distance from the end of the workpiece that a cut will be produced.

To utilize the edge guide 330, the face 334 is arranged to engage a side of a workpiece after the shaft 336 is secured to the depth guide base 250. The tool 200 is then moved along the surface of the workpiece, along with handle 224 and edge guide 330. While the tool 200 is moved along the workpiece, the face 334 of the edge guide 330 maintains contact with the edge of the workpiece. The edge guide 330 thus operates to maintain the tool 200 a fixed distance from the edge of the workpiece.

The shaft 336 is secured within the opening 320 by one or more fasteners 318. Fasteners 318 may thus serve a dual function of securing the shaft 336 of the edge guide 330 and the dust collector 300. The fastener 318 extends through the aperture 317 such that the end of the fastener 318 contacts a top edge of the shaft 336. Tightening the fastener 318 forces the shaft 336 into a locked position by forcing the shaft 336 against an extension or bridge (not shown) formed in the depth guide base 250. In an alternative embodiment, the opening 320 comprises an elongated aperture or channel in the base 250, such that tightening the fastener 31 8 forces the shaft 336 against an interior surface of the channel. Loosening the fastener 318 to release the shaft 336 allows sliding movement of the shaft 336 within the opening 320. In this manner, the distance from the face to the bit 220 may be modified without removing the edge guide 330 from the base 250.

In an exemplary embodiment, the edge guide 230 may be configured to allow a user of the tool 200 to cut circles in a workpiece. A cylinder or pin (not shown) may extend from the bottom surface of the shaft 336 or body portion 332 to provide a center point for a circle. In operation, the pin is inserted into a workpiece by inserting the pin into a hole in the workpiece or by forcing the pin into a workpiece. The location of the pin acts as a center for a circle that will be cut by a cutting tool 200 attached to the edge guide 330. A user may grasp the cutting tool with one hand and apply pressure to the location of the pin, and rotate the cutting tool around a circular path about the pin. In this manner, the edge guide may be configured for allowing a user to form circular cutting paths in a workpiece.

Although the present invention has been described with reference to certain exemplary and preferred embodiments, those of skill in the art will recognize that changes may be made in form and detail without departing from the spirit and scope of the invention as delineated by the appended claims. Those skilled in the art will appreciate that certain of these advantages can be obtained separately through reconfiguring or otherwise modifying the foregoing structure without departing from the spirit and scope of the invention.

What is claimed is:

1. A depth guide for a hand-held power tool, comprising:

a depth guide base;

a depth guide shaft attached to the depth guide base and configured to move between an extended and retracted position; and an automatic locking and release mechanism adjacent to the depth guide shaft for automatically locking the depth guide shaft into a locked position when the depth guide shaft is moved into a desired position;

wherein the automatic locking and release mechanism comprises a locking plate adjacent to the depth guide shaft, the locking plate including an aperture through which the depth guide shaft extends.

2. The depth guide of claim 1, further comprising means for biasing the depth guide shaft into an extended position when the depth guide shaft is released from the locked position.

3. The depth guide of claim 2, wherein the means for biasing the depth guide shaft into the extended position includes a spring coupled to the depth guide shaft.

4. The depth guide of claim 1, wherein the automatic locking mechanism automatically locks the depth guide shaft into a locked position by preventing movement of the depth guide shaft in the extending direction while allowing movement of the depth guide shaft in the retracting direction.

5. The depth guide of claim 1, further comprising a release switch coupled to the automatic locking mechanism to release the depth guide shaft from the locked position when the release switch is activated.

6. The depth guide of claim 5, further comprising a locking plate release element which engages the locking plate and is coupled to the release switch.

7. The depth guide of claim 5, wherein the locking plate is inclined relative to the longitudinal axis of the depth guide shaft when the depth guide shaft is in the locked position.

8. The depth guide of claim 1, further comprising a depth adjustment mechanism coupled to the depth guide shaft to prevent movement of the depth adjustment shaft in a retracting direction beyond a selected amount.

9. The depth guide of claim 1, further comprising depth gradations marked on the depth guide shaft.

10. The depth guide of claim 1, further comprising an edge guide coupled to the depth guide base.

11. The depth guide of claim 10, wherein the edge guide includes a shaft and the depth guide base includes an aperture, the edge guide shaft being adapted to be received in the aperture of the depth guide base.

12. A depth guide for a hand-held power tool, comprising:

a depth guide base;

a depth guide shaft attached to the depth guide base and configured to move between an extended and retracted position; and an automatic locking and release mechanism adjacent to the depth guide shaft for automatically locking the depth guide shaft into a locked position when the death guide shaft is moved into a desired position;

wherein the automatic locking and release mechanism comprises a locking plate adjacent to the depth guide shaft; and wherein the automatic locking and release mechanism is mounted in a hand-held power tool handle and the depth guide shaft extends from the hand-held power tool handle.

13. The depth guide of claim 12, wherein the hand-held power tool handle is attachable to and detachable from a hand-held power tool.

14. A depth guide for a hand-held power tool, comprising:

a depth guide base;

a depth guide shaft attached to the depth guide base and configured to move between an extended and retracted position;

an automatic locking and release mechanism adjacent to the depth guide shaft for automatically locking the depth guide shaft into a locked position when the depth guide shaft is moved into a desired position;

wherein the automatic locking and release mechanism comprises a locking plate adjacent to the depth guide shaft;

further comprising a release switch coupled to the automatic locking mechanism to release the depth guide shaft from the locked position when the release switch is activated; and wherein friction between the locking plate and the depth guide shaft locks the depth guide shaft in the desired position.

15. A depth guide for a hand-held power tool, comprising:

a handle;

a depth guide base;

a depth guide shaft attached to the depth guide base and received in the handle; and a locking element provided in the handle for securing the depth guide shaft in a locked position when the depth guide shaft is moved to a desired position, the locking element including an aperture through which the depth guide shaft extends.

16. The depth guide of claim 15, wherein the handle is attachable to and detachable from a hand-held power tool.

17. The depth guide of claim 15, wherein the depth guide shaft extends substantially perpendicular from the depth guide base.

18. The depth guide of claim 15, wherein the depth guide shaft is mounted for sliding movement in the handle.

19. The depth guide of claim 18, wherein a portion of the locking element adjacent to the aperture engages the depth guide shaft when the depth guide shaft is secured in the locked position.

20. The depth guide of claim 15, further comprising a release switch coupled to the handle and a locking element release element which engages the locking element and is coupled to the release switch.

21. The depth guide of claim 15, wherein the locking element is not substantially perpendicular to the longitudinal axis of the depth guide shaft when the depth guide shaft is in the locked position.

22. The depth guide of claim 15, wherein the aperture in the locking element is configured for allowing sliding movement of the depth guide shaft when the locking element is substantially perpendicular to a longitudinal axis of the depth guide shaft.

23. The depth guide of claim 15, further comprising a carrier within the handle for receiving the depth guide shaft.

24. The depth guide of claim 15, further comprising at least one bushing provided in the handle and around the depth guide shaft whereby the depth guide shaft is supported for sliding movement in the handle.

25. The depth guide of claim 15, further comprising means for biasing the depth guide shaft into an extended position when the depth guide shaft is released from the locked position.

26. The depth guide of claim 25, wherein the means for biasing the depth guide shaft into the extended position includes a spring coupled to the depth guide shaft.

27. The depth guide of claim 15, further comprising a depth adjustment mechanism whereby movement of the depth guide shaft in a retracting direction beyond a selected amount is prevented.

28. The depth guide of claim 27, wherein the depth adjustment mechanism includes a threaded element provided in the handle and extending therefrom and a depth adjustment stop coupled to the depth guide shaft that contacts the threaded element when the depth guide shaft is moved in a retracting direction to prevent movement of the depth guide shaft.

29. The depth guide of claim 28, wherein the depth adjustment stop includes a plurality of platforms, each of the platforms having a different height, wherein the depth guide stop is configured to allow alignment of at least one of the platforms with the threaded element.

30. The depth guide of claim 29, wherein the depth adjustment stop includes a screw threaded into an aperture formed in at least one of the platforms.

31. The depth guide of claim 15, further comprising a dust collector attached to the depth guide base.

32. The depth guide of claim 15, further comprising an edge guide attached to the depth guide base.

33. A depth guide for a hand-held power tool, comprising:

a handle configured for removable attachment to a hand-held power tool;

a depth guide base;

a depth guide shaft coupled to the depth guide base and configured for sliding movement within the handle; and a locking plate provided within the handle for automatically locking the depth guide shaft in a locked position, the depth guide shaft adjacent to at least a portion of the locking plate.

34. The depth guide of claim 33, wherein the handle includes a cam lock for securing the handle to a hand-held power tool.

35. The depth guide of claim 33, further comprising a carrier included in the handle for receiving the depth guide shaft.

36. The depth guide of claim 35, wherein the carrier is integrally formed in the handle.

37. The depth guide of claim 33, wherein the locking plate locks the depth guide shaft in a locked position when the depth guide shaft is moved to a desired position.

38. The depth guide of claim 33, further comprising a release switch coupled to the locking plate for releasing the depth guide shaft from the locked position when the release switch is actuated.

39. The depth guide of claim 38, wherein the locking plate comprises an aperture through which the depth guide shaft extends and an extension for engaging a locking plate release element coupled to the release switch.

40. The depth guide of claim 33, wherein at least a portion of the locking plate contacts the depth guide shaft in the locked position.

41. The depth guide of claim 33, wherein the depth guide shaft may slide freely when the locking plate is substantially perpendicular to a longitudinal axis of the depth guide shaft.

42. The depth guide of claim 33, wherein the locking plate is inclined in relation to the longitudinal axis of the depth guide shaft in the locked position.

43. The depth guide of claim 33, further comprising a depth guide stop provided on at least one of the depth guide shaft and the depth guide base.

44. The depth guide of claim 43, wherein the depth guide stop comprises a rotating member having a plurality of posts, the posts having differing heights.

45. The depth guide of claim 43, further comprising a depth adjustment mechanism coupled to the handle for engaging the depth guide stop.

46. The depth guide of claim 33, further comprising at least one spring for biasing the handle in an extended direction.

47. The depth guide of claim 46, wherein the depth guide shaft includes a hollow center portion and the at least one spring extends through the hollow center portion and couples with a pin coupled to the depth guide shaft.

48. The depth guide of claim 33, further comprising an edge guide attached to the depth guide base.

49. The depth guide of claim 33, further comprising a dust collector attached to the depth guide base.

50. An automatic-locking depth guide for a hand-held power tool, comprising:

a handle for a hand-held power tool;

a release switch coupled to the handle;

a depth guide base;

a depth guide shaft attached to the depth guide base and mounted in the hand-held power tool handle such that the depth guide shaft extends from the hand-held power tool handle; and a depth guide locking mechanism contained within the handle, the locking mechanism including a locking plate, the locking plate comprising an aperture through which the depth guide shaft extends and an extension for engaging a release element coupled to the release switch.

51. The depth guide of claim 50, wherein the handle is removably attached to a hand-held power tool.

52. The depth guide of claim 51, further comprising at least one spring for biasing the handle in an extended direction.

53. The depth guide of claim 52, wherein the depth guide shaft includes a hollow center portion and the spring extends through the hollow center portion and couples with a pin in the depth guide shaft.

54. The depth guide of claim 50, wherein the handle includes a cam lock for securing the handle to a hand-held power tool.

55. The depth guide of claim 50, wherein the depth guide base extends perpendicularly from the depth guide shaft.

56. The depth guide of claim 50, further comprising a carrier included in the handle for receiving the depth guide shaft.

57. The depth guide of claim 56, wherein the carrier is integrally formed in the handle.

58. The depth guide of claim 50, wherein the locking mechanism locks the depth guide shaft in a locked position when the depth guide shaft is moved to a desired position.

59. The depth guide of claim 58, wherein the release switch releases the depth guide shaft from the locked position when actuated.

60. The depth guide of claim 50, wherein a portion of the locking plate engages the depth guide shaft when the depth guide is in a locked position.

61. The depth guide of claim 50, wherein the depth guide shaft may slide freely when the locking plate is substantially perpendicular to a longitudinal axis of the depth guide shaft.

62. The depth guide of claim 50, wherein the locking plate is inclined in relation to the depth guide shaft when the depth guide is in a locked position.

63. The depth guide of claim 50, further comprising a depth guide stop coupled to the depth guide shaft.

64. The depth guide of claim 63, wherein the depth guide stop comprises a rotating member having a plurality of posts, the posts having differing heights.

65. The depth guide of claim 64, further comprising a depth adjustment screw coupled to the handle for engaging the depth guide stop.

66. The depth guide of claim 50, further comprising an edge guide attached to the depth guide base.

67. The depth guide of claim 50, further comprising a dust collector attached to the depth guide base.

68. A hand-held power tool, comprising:

a motor housing for containing a hand-held power tool motor;

a depth guide attached to the motor housing, the depth guide configured for automatically locking the position of the depth guide when the depth guide is moved to a desired position;

a depth guide shaft configured for sliding movement within the depth guide; and a locking plate including an aperture for receiving the depth guide shaft and for engaging the depth guide shaft to lock the position of the depth guide shaft.

69. The hand-held power tool of claim 68, wherein the depth guide is removably attached to the motor housing.

70. The hand-held power tool of claim 68, wherein the depth guide is removably attached to the motor housing by a screw fastener.

71. The hand-held power tool of claim 68, further comprising a release switch for releasing the depth guide from a locked position.

72. The hand-held power tool of claim 71, wherein the locking plate is provided within the depth guide.

73. The hand-held power tool of claim 68, wherein the locking plate is provided within the depth guide.

74. The hand-held power tool of claim 68, wherein the depth guide shaft may travel freely through the aperture when the locking plate is substantially perpendicular to a longitudinal axis of the depth guide shaft.

75. The hand-held power tool of claim 68, wherein at least a portion of the locking plate engages the depth guide shaft when the locking plate is inclined relative to a longitudinal axis of the depth guide shaft.

76. The hand-held power tool of claim 68, further comprising a torsion spring for biasing the locking plate in an inclined position relative to a longitudinal axis of the depth guide shaft.

77. The hand-held power tool of claim 68, wherein the locking plate further comprises an extension, the extension coupled to a release switch for releasing the depth guide from a locked position.

78. The hand-held power tool of claim 68, further comprising at least one of an edge guide, a dust collector, and a depth guide stop coupled to the depth guide.

* * * * *

UNITED STATES PATENT AND TRADEMARK OFFICE

CERTIFICATE OF CORRECTION

PATENT NO. : 6,854,938 B2

DATED : February 15, 2005

INVENTOR(S) : Robert K. Kopras et al.

It is certified that error appears in the above-identified patent and that said Letters Patent is hereby corrected as shown below:

Column 12,

Line 28, please replace “death” with -- depth --.

Signed and Sealed this

Twenty-fourth Day of May, 2005

JON W. DUDAS

*Director of the United States Patent and Trademark Office*